(12) United States Patent
Hong et al.

(10) Patent No.: US 12,607,713 B1
(45) Date of Patent: Apr. 21, 2026

(54) SYSTEMS AND METHODS FOR SPATIAL TEMPORAL MULTI-SNAPSHOT RADAR SIGNAL PROCESSING

(71) Applicant: Oculii Corp., Beavercreek, OH (US)

(72) Inventors: Lang Hong, Beavercreek, OH (US); Steven Hong, Xenia, OH (US); Kiran Vaidyanathan, Beavercreek, OH (US); Kranthi Kumar Madhavaram, West Carrollton, OH (US)

(73) Assignee: Oculii Corp., Beavercreek, OH (US)

( * ) Notice: Subject to any disclaimer, the term of this patent is extended or adjusted under 35 U.S.C. 154(b) by 384 days.

(21) Appl. No.: 18/140,958

(22) Filed: Apr. 28, 2023

Related U.S. Application Data

(63) Continuation-in-part of application No. 18/129,834, filed on Apr. 1, 2023.

(51) Int. Cl.
   G01S 7/295 (2006.01)
   G01S 7/288 (2006.01)

(52) U.S. Cl.
   CPC .............. G01S 7/295 (2013.01); G01S 7/288 (2013.01); G01S 7/2883 (2021.05)

(58) Field of Classification Search
   None
   See application file for complete search history.

(56) References Cited

U.S. PATENT DOCUMENTS 11,906,655 B2 * 2/2024 Vossiek ............... G01S 13/9023

* cited by examiner

*Primary Examiner* — Whitney Moore
(74) *Attorney, Agent, or Firm* — Maiorana Patent Law, PA

(57) ABSTRACT

An apparatus comprising an interface and a processor. The interface may be configured to receive a stream of data from a radar. The processor may be configured to receive the stream, process a first data cube from the data during a first frame, process a second data cube from the data during a second frame, perform continuous interleaving of the second data cube with the first data cube as the data is received, generate first output data in response to the first data cube and generate second output data in response to the continuous interleaving. The first time frame may overlap with the second time frame after the second time frame starts to enable the continuous interleaving. Performing the continuous interleaving may enable a limited variation between the data cubes. The limited variation may enable the second output data to be derived from the first output data.

19 Claims, 11 Drawing Sheets

ANGLE SPATIAL DIMENSION

TEMPORAL DIMENSION

RANGE SPATIAL DIMENSION

406

400

410d

410c

410b

410a

402

404

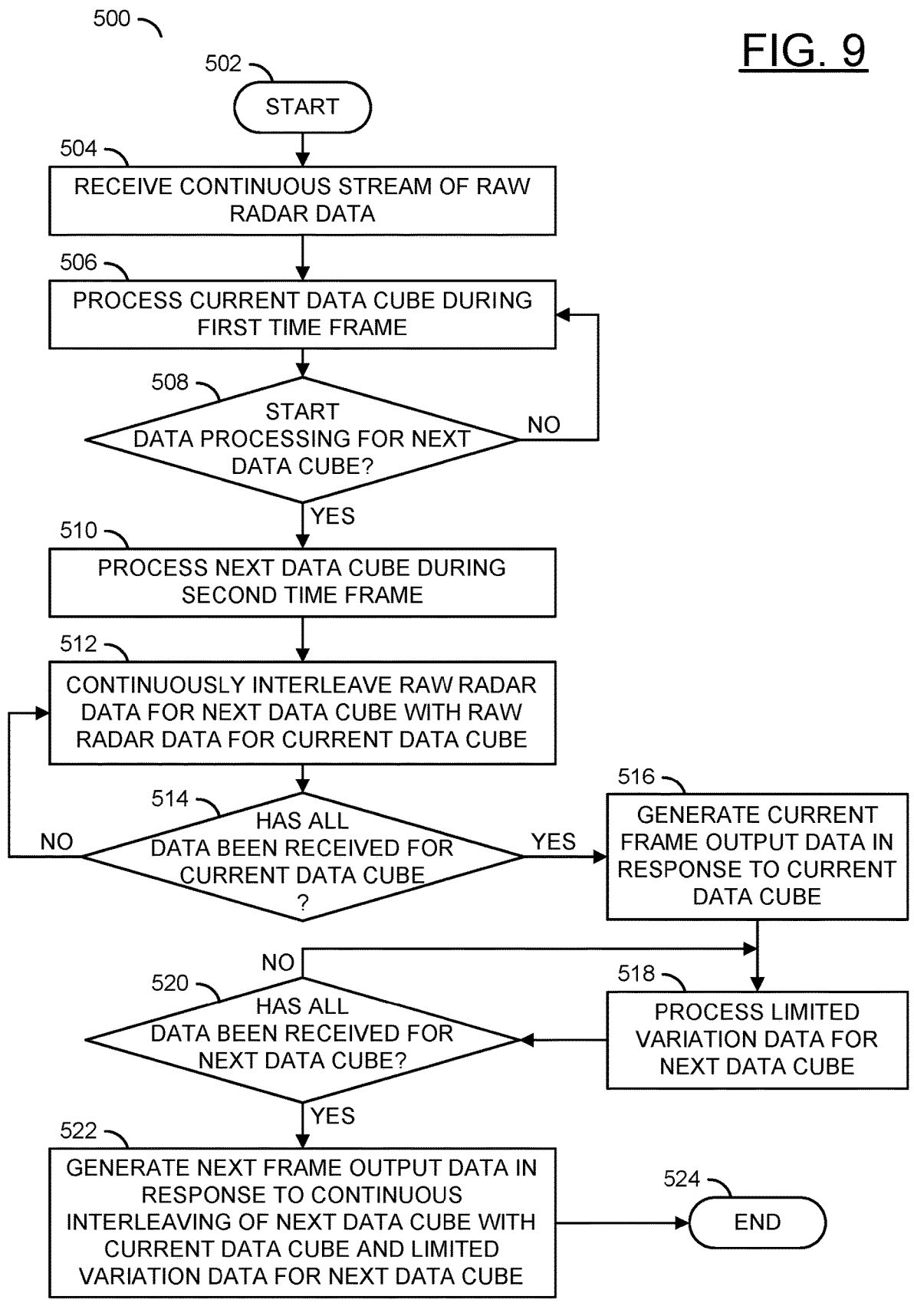

START

504

RECEIVE CONTINUOUS STREAM OF RAW RADAR DATA

506

PROCESS CURRENT DATA CUBE DURING FIRST TIME FRAME

508

START DATA PROCESSING FOR NEXT DATA CUBE?    NO

YES

510

PROCESS NEXT DATA CUBE DURING SECOND TIME FRAME

512

CONTINUOUSLY INTERLEAVE RAW RADAR DATA FOR NEXT DATA CUBE WITH RAW RADAR DATA FOR CURRENT DATA CUBE

514

NO   HAS ALL DATA BEEN RECEIVED FOR CURRENT DATA CUBE ?    YES

516

GENERATE CURRENT FRAME OUTPUT DATA IN RESPONSE TO CURRENT DATA CUBE

NO

520

HAS ALL DATA BEEN RECEIVED FOR NEXT DATA CUBE?

518

PROCESS LIMITED VARIATION DATA FOR NEXT DATA CUBE

YES

522

GENERATE NEXT FRAME OUTPUT DATA IN RESPONSE TO CONTINUOUS INTERLEAVING OF NEXT DATA CUBE WITH CURRENT DATA CUBE AND LIMITED VARIATION DATA FOR NEXT DATA CUBE

524

END

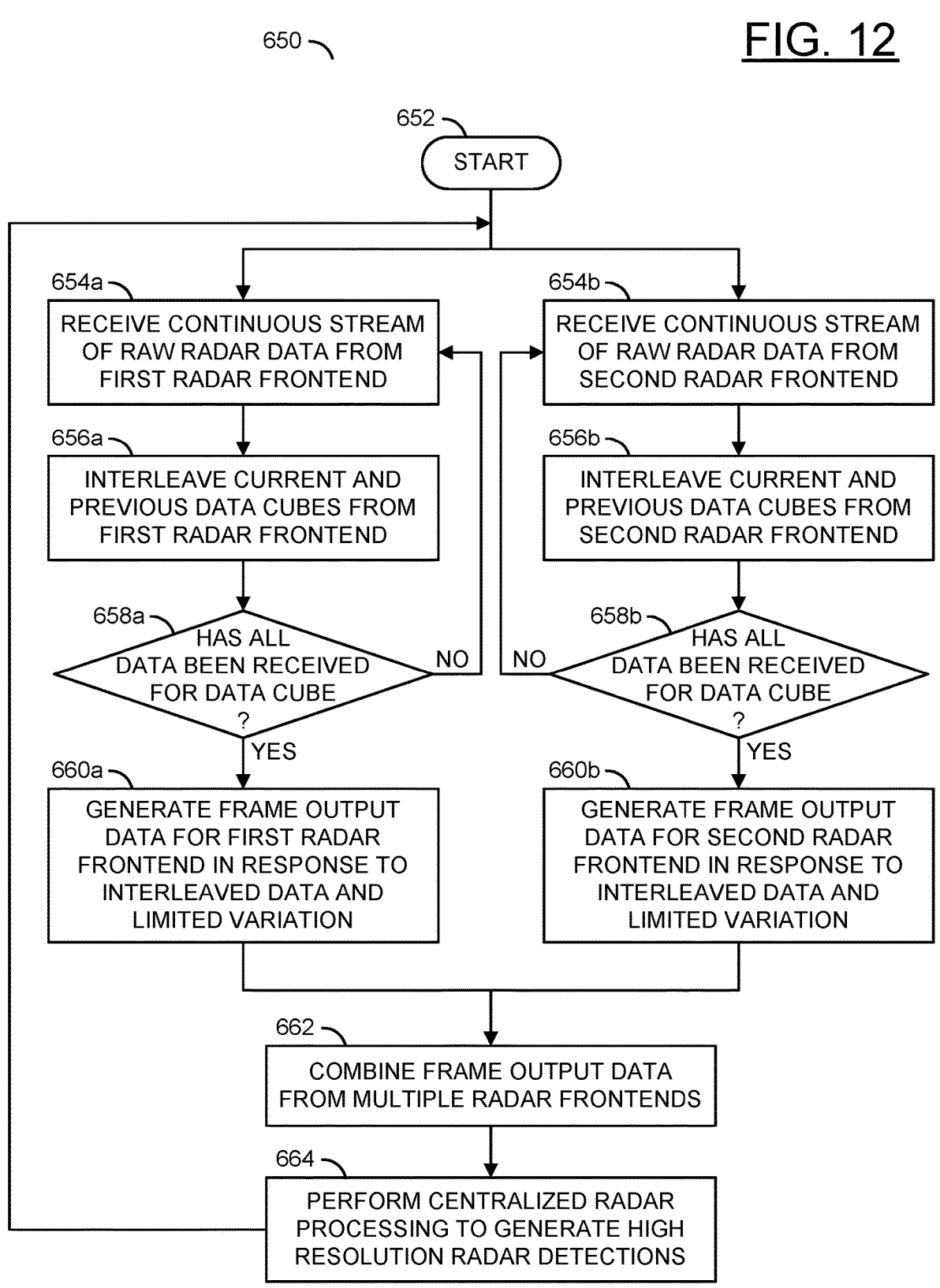

652 ⟋

START

654a ⟋
RECEIVE CONTINUOUS STREAM OF RAW RADAR DATA FROM FIRST RADAR FRONTEND

654b ⟋
RECEIVE CONTINUOUS STREAM OF RAW RADAR DATA FROM SECOND RADAR FRONTEND

656a ⟋
INTERLEAVE CURRENT AND PREVIOUS DATA CUBES FROM FIRST RADAR FRONTEND

656b ⟋
INTERLEAVE CURRENT AND PREVIOUS DATA CUBES FROM SECOND RADAR FRONTEND

658a ⟋
HAS ALL DATA BEEN RECEIVED FOR DATA CUBE ?
NO

658b ⟋
HAS ALL DATA BEEN RECEIVED FOR DATA CUBE ?
NO
YES

660a ⟋
GENERATE FRAME OUTPUT DATA FOR FIRST RADAR FRONTEND IN RESPONSE TO INTERLEAVED DATA AND LIMITED VARIATION

660b ⟋
GENERATE FRAME OUTPUT DATA FOR SECOND RADAR FRONTEND IN RESPONSE TO INTERLEAVED DATA AND LIMITED VARIATION

662 ⟋
COMBINE FRAME OUTPUT DATA FROM MULTIPLE RADAR FRONTENDS

664 ⟋
PERFORM CENTRALIZED RADAR PROCESSING TO GENERATE HIGH RESOLUTION RADAR DETECTIONS

SYSTEMS AND METHODS FOR SPATIAL TEMPORAL MULTI-SNAPSHOT RADAR SIGNAL PROCESSING

This application relates to U.S. application Ser. No. 18/129,834, filed on Apr. 1, 2023, which is hereby incorporated by reference in its entirety.

FIELD OF THE INVENTION

The invention relates to radar detection generally and, more particularly, to a method and/or apparatus for implementing systems and methods for spatial temporal multi-snapshot radar signal processing.

BACKGROUND

In conventional radar signal processing technology, there is an inherent conflict between generating high radar resolutions and providing a high radar output rate. The inherent conflict results in a trade-off between either achieving high radar resolutions while sacrificing the output rate or achieving a high output rate while sacrificing the resolution of output. Both high radar resolutions and a high output rate need to be achieved simultaneously in order to efficiently provide radar output that is useful for real-time applications.

Conventional radar technology generates non-continuous and non-coherent data snapshots, which are not easy for radar data integration. The non-continuous and non-coherent data snapshots provide a single data frame. Single frame (i.e., single snapshot) radar performance is completely determined by the radar data cube captured. A size of the data cube determines a minimum separability. Generally, more samples (with a fixed sampling rate) provide better range resolution, a larger number of samples per frame (with a fixed temporal sample interval) results in a better Doppler resolution and more spatial samples result in a better angle resolution. A density of the data cube may determine a maximum sensing scope. Generally, denser data has a larger maximum of physical limits, a smaller sample spacing (Ts) (i.e., denser samples) results in a larger maximum range value (range is actually limited by a maximum transmitting power), denser temporal samples per frame may result in a larger maximum velocity, and denser spatial samples result in a larger azimuth/elevation field of view. A homogeneity of the data cube may determine a quality of the radar signal. Generally, more homogeneous data may result in better radar quality (i.e., smaller side lobes and ripples). The signal to noise ratio of the radar signal may be partially proportional to a number of chirps. Generally, more chirps result in a better signal to noise ratio.

Conventional radar technology may be limited in processing multiple frames of data. A radar signal output frame rate (F) is inverse proportional to the frame interval (TF), such that a smaller TF results in a larger frame rate F. Data may be processed with a fixed data processing time (TDP). Generally, a better Doppler resolution results in a larger number of samples per frame (N), which results in a larger frame interval TF, which results in a smaller output frame rate F, which results in a small output volume throughput (for a fixed number of detections per frame). There is an inherent conflict between Doppler resolution and output frame rate (output data volume throughput). In a single snapshot frame-work, each data snapshot has a significant angle information difference and is uncoherent. With uncoherent data and a large angle information difference, the data snapshots cannot be directly integrated (accumulated).

It would be desirable to implement systems and methods for spatial temporal multi-snapshot radar signal processing.

SUMMARY

The invention concerns an apparatus comprising an interface and a processor. The interface may be configured to receive a continuous stream of raw radar data from a radar communication device. The processor may be configured to receive the continuous stream of the raw radar data from the interface, process a first data cube from the raw radar data during a first time frame, process a second data cube from the raw radar data during a second time frame, perform a continuous interleaving of the second data cube with the first data cube as the raw radar data for the first data cube and the second data cube are received, generate a first frame output data in response to the first data cube and generate a second frame output data in response to the continuous interleaving of the second data cube with said first data cube. The first time frame may start before the second time frame. The first time frame may overlap with the second time frame after the second time frame starts to enable the continuous interleaving of the second data cube with the first data cube. Performing the continuous interleaving of the second data cube with the first data cube may enable an overlapping portion of information between the first data cube and the second data cube to be equivalent and a limited variation between the first data cube and the second data cube. The limited variation may enable the second frame output data to be derived from the first frame output data.

BRIEF DESCRIPTION OF THE FIGURES

Embodiments of the invention will be apparent from the following detailed description and the appended claims and drawings.

FIG. 9 is a flow diagram illustrating a method for performing spatial temporal multi-snapshot radar signal processing.

FIG. 12 is a flow diagram illustrating a method for implementing centralized spatial temporal multi-snapshot radar signal processing.

DETAILED DESCRIPTION OF THE EMBODIMENTS

Figure 1:
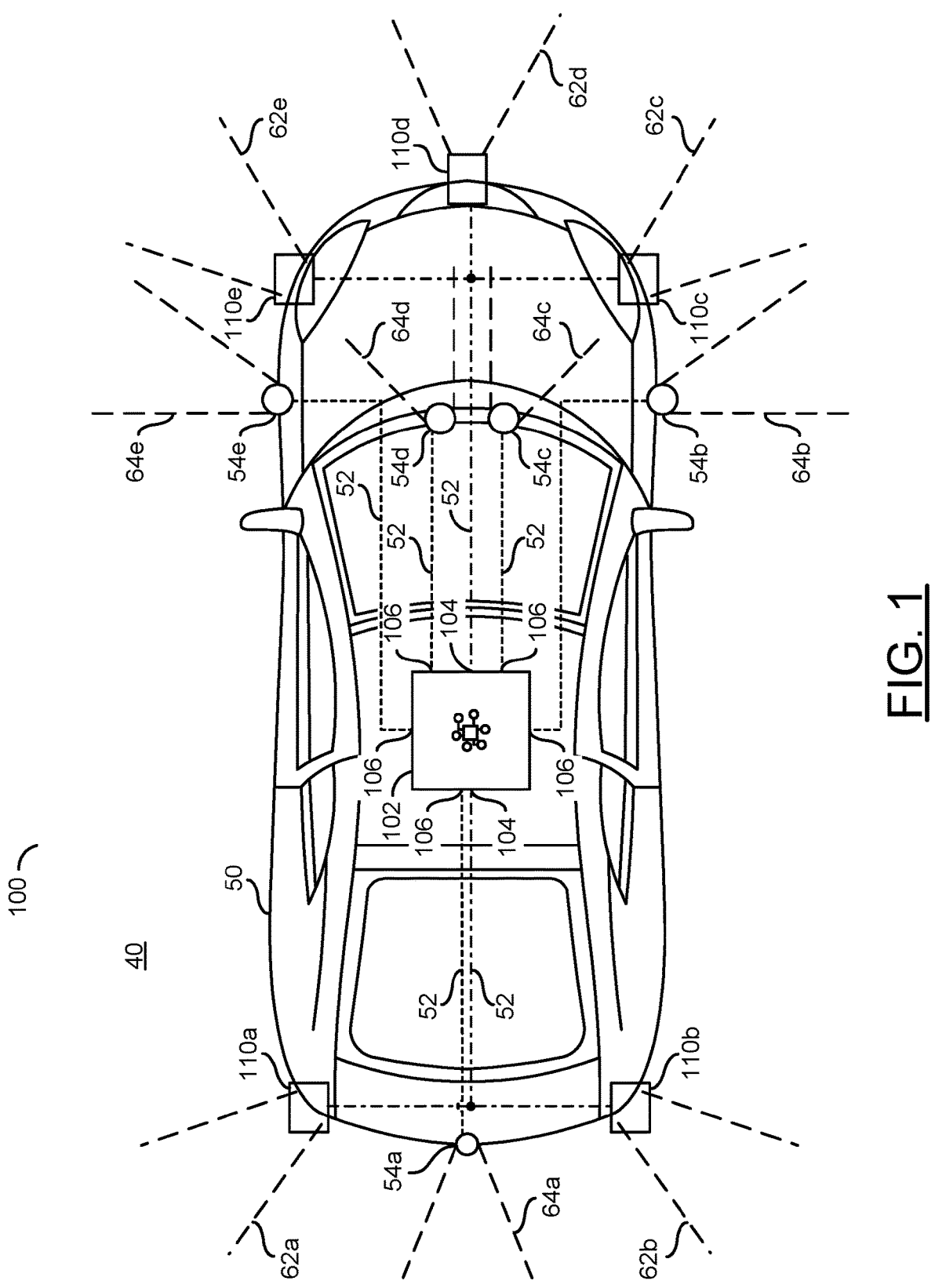
FIG. 1 is a diagram illustrating an embodiment of the present invention implemented in a vehicle.

Embodiments of the present invention include providing systems and methods for spatial temporal multi-snapshot radar signal processing that may (i) simultaneously provide high radar resolutions and a high radar output rate, (ii) achieve continuous coherent, multi-snapshot radar integration, (iii) enable efficient recursive updates of multi-snapshot information, (iv) interleave data between multiple data cubes, (v) enable variable data cube sizes to reduce output latency, (vi) interleave data cube data in a temporal domain, (vii) interleave data cube data in a range domain, (viii) interleave data cube data in an angle domain, (ix) receive and process a continuous stream of raw radar data to achieve large data cubes, (x) perform radar signal processing of multiple radar edge devices using a centralized processor and/or (xi) be implemented as one or more integrated circuits.

Embodiments of the present invention may be configured to implement spatial temporal multi-snapshot (STMS) radar signal processing. The STMS data integration implemented may enable radar output data to be generated with a high radar resolution and a high radar output rate. The SIMS data integration and radar processing may be configured to overcome an inherent conflict in radar signal processing between radar resolution and the output rate. The high radar resolution generated without sacrificing the high radar output may be achieved in response to enabling continuous multi-snapshot radar data integration. Integrating continuous multi-snapshot information may provide a relatively small (e.g., limited) amount of variation between data snapshots, which may be processed efficiently. In one example, a limited variation between data snapshots in a temporal dimension may provide a limited difference in angle information between data cubes. For example, STMS data integration may enable an exploration of continuous multi-look angle diversity. The continuous multi-snapshot integration implemented by the STMS data integration may provide interleaving and a coherent multi-look multi-snapshot data processing architecture.

Embodiments of the present invention may be configured to continuously interleave data cubes as raw radar data is streamed into a centralized processor. By continuously interleaving the data cubes from multiple snapshots, the conflict between resolution and the output rate may be resolved. For example, an output resolution may generally be proportional to a size of the data cube and the output rate may generally be inversely proportional to the size of the data cube (e.g., to get high resolution a large data cube may be beneficial, but to get a high output rate a small data cube may be beneficial). Without the interleaving performed by the STMS radar signal processing, both a high resolution and a high output rate may not be achievable simultaneously. The STMS data integration implemented may resolve the inherent conflict between the requirements for a high output resolution and high output rate in radar signal processing.

Embodiments of the present invention may enable efficient multi-snapshot information recursive updates. For example, the recursive data cube processing update may be computationally efficient since (due to interleaving) a small portion of new information may be received between two data cubes. Embodiments of the present invention may be configured to process variable data cube sizes. The data cube sizes processed may be variable by iteratively increasing the size of the data cubes until a predetermined data cube size is reached. Processing the variable sized data cubes may enable output data to be generated with less latency. For example, the smaller sized data cubes may be processed to output data quickly (e.g., at potentially a lower resolution) until the predetermined data cube size is reached instead of waiting with no output data until the first predetermined size data cube to be processed. Embodiments of the present invention may be configured to interleave the data cubes in different dimensions. For example, the data cubes may be interleaved in a temporal dimension, a range dimension and/or an angle dimension.

Embodiments of the present invention may be configured to receive a continuous stream of raw radar data from a radar edge device. In one example, a radar device may be implemented as an edge device on a vehicle. A centralized processing device may be configured to perform the SIMS radar signal processing. For example, the raw radar data generated by the radar edge device may be streamed from the radar device to the centralized processing device without local processing by the radar device. The centralized processing device may have sufficient processing throughput and/or memory capacity to process large sized data cubes and/or interleave the raw radar data between multiple snapshots of data cubes. The centralized processing device may be configured to receive the continuous stream of raw radar data from and/or perform the STMS radar signal processing for multiple radar edge devices. A centralized architecture of the centralized processing device may enable the continuous streaming of the raw radar data.

Embodiments of the present invention may be configured to output the processed data cubes. For example, the centralized processing device may be configured to perform the STMS radar signal processing on the raw data in the data cubes. Frame output data may be generated in response to processing the raw data of each of the data cubes. Without implementing the centralized processing device, each radar device may have a local memory and local processor, which has relatively low processing capabilities, resulting in a longer processing time before frame data may be processed. Since the centralized processing device may not suffer from the long processing time, the raw radar data may be processed continuously.

Referring to FIG. 1, a diagram illustrating an embodiment of the present invention implemented in a vehicle is shown. A system 100 is shown. The example embodiment of the system 100 may be shown in the context of a top down view of a vehicle 50 in an environment 40. In the example shown, the vehicle 50 may be a car. In some embodiments, the vehicle 50 may be a truck, an ATV, an airplane, a drone, etc. In one example, the vehicle 50 may be an electric vehicle (EV). In another example, the vehicle 50 may be a hybrid electric vehicle. In yet another example, the vehicle 50 may be an internal combustion engine (ICE) vehicle. The type of the vehicle 50 implementing the system 100 may be varied according to the design criteria of a particular implementation.

The vehicle 50 may comprise a data network 52, a number of blocks (or circuits) 54a-54e, a block (or circuit) 102, an interface 104, and interface 106 and/or a number of blocks (or circuits) 110a-110e. The circuits 54a-54e may each implement a camera system. The circuit 102 may implement a centralized processing device. The circuits 110a-110e may each implement a radar device and/or frontend. While the radar frontends 110a-110e and the camera systems 54a-54e are shown, the vehicle 50 may comprise more or fewer of the radar frontends 110a-110e and/or the camera systems 54a-54e. In some embodiments, the vehicle 50 may comprise multiple implementations of the centralized processing device 102. The vehicle 50 may comprise other components (not shown). For example, other types of sensors may be implemented (e.g., sonar, lidar, ultrasonics, etc.). The number, type and/or arrangement of the components of the vehicle 50 may be varied according to the design criteria of a particular implementation.

The data network 52 may be implemented throughout the vehicle 50. The data network 52 may be configured to communicate data from an edge site of the vehicle 50 (e.g., an edge site at the locations of the radar frontends 110a-110e and/or the camera systems 54a-54e) to other components of the vehicle 50. In an example, the data network 52 may be configured to communicate data from various sensors to corresponding ECUs. In another example, the data network 52 may be configured to communicate data to/from the centralized processing device 102. The data network 52 may be configured to communicate data according to a predefined protocol (e.g., a CAN bus communications protocol, an I2C bus protocol, an Ethernet protocol, a wireless protocol, etc.). Generally, the data network 52 may comprise a low bandwidth, low cost data bus implemented by the vehicle 50 (e.g., data buses that may be common in commercially available vehicles). In one example, the data network 52 may implement a CAN bus of the vehicle 50. In some embodiments, the amount of data communicated throughout the vehicle 50 may be limited to the constraints of the data network 52. The implementation of the data network 52 may be varied according to the design criteria of a particular implementation.

The centralized processing device 102 may be configured to communicate data to/from the data network 52. The centralized processing device 102 may comprise the interface 104 and/or the interface 106. The interface 104 may be a radar data interface. The radar data interface 104 may be configured to receive data communicated by the radar frontends 110a-110e via the data network 52. The radar data interface 104 may be configured to send data generated from the centralized processing device 102 via the data network 52 to one or more of the radar frontends 110a-110e. The interface 106 may be a video data interface. The video data interface 106 may be configured to receive data communicated by the camera systems 54a-54e via the data network 52. The video data interface 106 may be configured to send data generated from the centralized processing device 102 via the data network 52 to one or more of the camera systems 54a-54e. Additional interfaces (e.g., a sensor data interface) may be implemented by the centralized processing device 102 (e.g., to communicate data to/from various other sensors, not shown). In some embodiments, the radar data interface 104 and/or the video data interface 106 may comprise a number of data ports. The radar data interface 104 and/or the video data interface 106 may be configured to convert and/or translate data for compatibility with the communication standard implemented by the data network 52. The number, type and/or implementation of the radar data interface 104, the video data interface 106 and/or other interfaces of the centralized processing device 102 may be varied according to the design criteria of a particular implementation.

The radar devices (or frontends) 110a-110e may be located at various edge sites of the vehicle 50. The edge sites of the vehicle 50 may be located at a periphery of the vehicle 50 and/or throughout the vehicle 50. In the example shown, the radar frontend 110d may be implemented on a front bumper of the vehicle 50. In another example, the radar frontends 110a-110b are shown implemented on either side of a rear bumper of the vehicle 50. In some embodiments, one or more of the radar frontends 110a-110e may be implemented on a periphery of the vehicle 50. In some embodiments, one or more of the radar frontends 110a-110e may be implemented on a roof the vehicle 50. The of number radar frontends 110a-110e implemented and/or the particular edge sites of the vehicle 50 that the radar frontends 110a-110e may be implemented at may be varied according to the design criteria of a particular implementation.

The radar frontends 110a-110e may each be configured to determine a proximity and/or location of objects/obstacles around the vehicle 50. The radar frontends 110a-110e may be configured as long-range and/or short-range sensors. The radar frontends 110a-110e may be configured to generate a radar (or probe) signal, which may be reflected back to the radar frontends 110a-110e by the objects near the vehicle 50. The reflected data received by the radar frontends 110a-110e corresponding to the radar signal may be processed and/or analyzed in order to generate data about the objects in the environment 40 near the vehicle 50. In some embodiments, the data generated by the radar frontends 110a-110e may be used by the centralized processing device 102 to create a radar mapping of the environment 40.

Pairs of dashed lines 62a-62e are each shown extending from a respective one of the radar frontends 110a-110e. The pairs of dashed lines 62a-62e may represent a radio frequency pattern emitted by the respective radar frontends 110a-110e. The shape, intensity and/or direction of the radio frequency patterns 62a-62e may determine a detection range of the radar frontends 110a-110e. The radar frontends 110a-110e may be implemented at various locations around the vehicle 50. The radio frequency patterns 62a-62e may be generally emitted all around the vehicle 50 in order to capture data about the environment 40 in all directions from the vehicle 50. The radio frequency patterns 62a-62e may have a range of approximately 200 meters to 450 meters, with a 150 degree azimuth field of view and a 45 degree elevation field of view. The particular range of the radio frequency patterns 62a-62e may be varied according to the design criteria of a particular implementation.

The radar frontends 110a-110e may each implement an antenna array and/or waveguide network. The antenna array and/or waveguide network implemented by the radar frontends 110a-110e may enable a sparse array configured to provide information that may be used by the centralized processing device 102 to reconstruct a high resolution of data. In an example, the radar frontends 110a-110e may each be configured to generate a dynamic waveform and the centralized processing device 102 may use artificial intelligence to learn from and/or adapt to the environment 40 near the vehicle 50. The sparse array implemented by the radar frontends 110a-110e may enable a high resolution of data to be acquired with a low module cost. The radar frontends 110a-110e may be configured to generate raw radar data at a low volume that may be converted to a high resolution of data while consuming between 3 watts to 10 watts of power. Details of the antenna array and/or waveguide network implemented by the radar frontends 110a-110e may be described in association with U.S. application Ser. No. 17/945,379, filed on Sep. 15, 2022 and U.S. application Ser. No. 17/958,268, filed on Sep. 30, 2022, appropriate portions of which are incorporated by reference.

In some embodiments, the radar frontends 110a-110e may comprise antenna arrays that generate raw radar data with sparsity (e.g., low volume data). In some embodiments, the radar frontends 110a-110e may comprise antenna arrays with a dense array that generate raw radar data without sparsity (e.g., high volume data). In some embodiments, the radar frontends 110a-110e may comprise a combination of radar devices with sparsity and without sparsity. Radar data without sparsity may undergo data sparsification (e.g., as an aftermarket add-on) to convert the high volume of data to a low volume of data before being sent over the data network 52.

The camera systems 54a-54e may be configured to capture pixel data, generate images and/or generate video frames of the environment 40 near the vehicle 50. In some embodiments, the pixel data may be communicated over the data network 52 to the centralized processing device 102 and the centralized processing device 102 may be configured to generate video frames in response to the pixel data. In some embodiments, the camera systems 54a-54e may be configured to generate video frames in response to the pixel data captured, compress the video frames and the compressed video frames may be communicated over the data network 52 to the centralized processing device 102. The video frames generated based on the data from the camera systems 54a-54e may be used for computer vision operations to detect objects/obstacles around the vehicle 50. The camera systems 54a-54e may comprise RGB cameras, RGB-IR cameras, stereo cameras, monocular cameras, thermal imaging cameras, etc. The number and/or types of the camera systems 54a-54e implemented may be varied according to the design criteria of a particular implementation.

Pairs of dashed lines 64a-64e are each shown extending from a respective one of the camera systems 54a-54e. The pairs of dashed lines 64a-64e may represent a field of view captured by the camera systems 54a-54e. The fields of view 64a-64e of the camera systems 54a-54e may or may not overlap with the regions covered by the radio frequency patterns 62a-62e of the radar frontends 110a-110e. The camera systems 54a-54e may be implemented at various locations (e.g., edge sites) around the vehicle 50. The fields of view 64a-64e may be generally captured all around the vehicle 50 in order to capture data of the environment 40 in all directions from the vehicle 50 (e.g., a 360 degree field of view). The particular range and/or directions of the fields of view 64a-64e may be varied according to the design criteria of a particular implementation.

The centralized processing device 102 is shown at a generally central location in the vehicle 50. In an example, the centralized processing device 102 may implement a zone (or domain) processor. The centralized processing device 102 may be configured to receive input comprising the output from the radar frontends 110a-110e (e.g., raw radar data) and/or the video frames generated by the camera systems 54a-54e. In some embodiments, multiple implementations of the centralized processing device 102 may be implemented near groups (or clusters) of the radar frontends 110a-110e and/or the camera systems 54a-54e (e.g., at a particular zone of the vehicle 50). The location(s) of the centralized processing device 102 and/or the number of the radar frontends 110a-110e and/or camera systems 54a-54e that provide data to the centralized processing device 102 may be varied according to the design criteria of a particular implementation.

The centralized processing device 102 may be configured to process raw data streams generated by the radar frontends 110a-110e, the camera systems 54a-54e and/or other sensors. The centralized processing device 102 may be configured to implement deep sensor fusion in order to combine interpretations of the data from the radar frontends 110a-110e with interpretations of the data from the camera systems 54a-54e and/or data inputs from other sensors (not shown) in order to make inferences using multiple sources of data that would not be possible based on one of the data sources alone. In an example, the centralized processing device 102 may be configured to interpret the high resolution data generated in response to the low volume data provided by the radar frontends 110a-110e. In another example, the centralized processing device 102 may be configured to perform computer vision operations on the video frames generated by the camera systems 54a-54e in order to detect objects.

The centralized processing device 102 may be configured to implement central compute capabilities that enable high performance without implementing a dedicated processor for each of the radar frontends 110a-110e. Implementing the centralized processing device 102 may enable the radar frontends 110a-110e to be implemented at a lower cost because a dedicated processor may not be implemented for each of the radar frontends 110a-110e. The centralized processing device 102 may be configured to enable sparsity in the implementation of the radar frontends 110a-110e in order to determine the boundary conditions for a particular resolution of data. The centralized processing device 102 may enable the radar frontends 110a-110e to undersample the environment while preventing artifacts, grading lobes and/or false alarms.

The centralized processing device 102 may be configured to adaptively modulate the information generated by the radar frontends 110a-110e to enable fewer antennas to be implemented in the antenna arrays of the radar frontends 110a-110e. Instead of processing data from the radar frontends 110a-110e at the edge (e.g., one processor on-board with the same technology node for each of the radar frontends 110a-110e), the sparse (e.g., low volume) raw radar data from the radar frontends 110a-110e may be processed by the centralized processing device 102. The sparse antenna array implemented by the radar frontends 110a-110e may enable low bandwidth data to be transmitted from the radar frontends 110a-110e over the data network 52 to the centralized processing device 102. The centralized processing device 102 may be configured to expand the resolution of the data received from the radar frontends 110a-110e. The centralized processing device 102 may be configured to dynamically shift radar processing capabilities around the vehicle 50 on an as-needed basis in response to various detection scenarios. The centralized processing device 102 may be configured to implement joint bistatic processing from multiple of the distributed radar frontends 110a-110e to provide a high resolution and/or sensitivity.

The centralized processing device 102 may utilize a dynamic adaptive waveform. The centralized processing device 102 may learn and/or adapt to the environment 40. The centralized processing device 102 may take advantage of sparsity to capture the boundary conditions for the data that may be used for providing a particular resolution. Sparsity may undersample the environment 40. To avoid grading lobes and/or artifacts that may result from multiple solutions that may be available for reconstructing a dense amount of data using sparsity, an adaptive waveform may be implemented. The adaptive waveform used for the radio frequency patterns 62a-62e may provide a shifting waveform that may be effectively controlled in a deterministic fashion. By adaptively modulating the information, fewer antennas may be used by each of the radar frontends 110a-110e. Artifacts from the sparsity may be suppressed by aggregating information that may be adaptive over time. The adaptive waveform implemented may provide a sparse data cube that may enable reconstructing a high resolution of radar detections that no longer scales with the number of antennas implemented by the radar frontends 110a-110e. The high resolution of the radar detections may scale with how efficiently the centralized processing device 102 performs computations and/or how quickly a phase may be modulated onto the adaptive transmitted signal.

Figure 2:
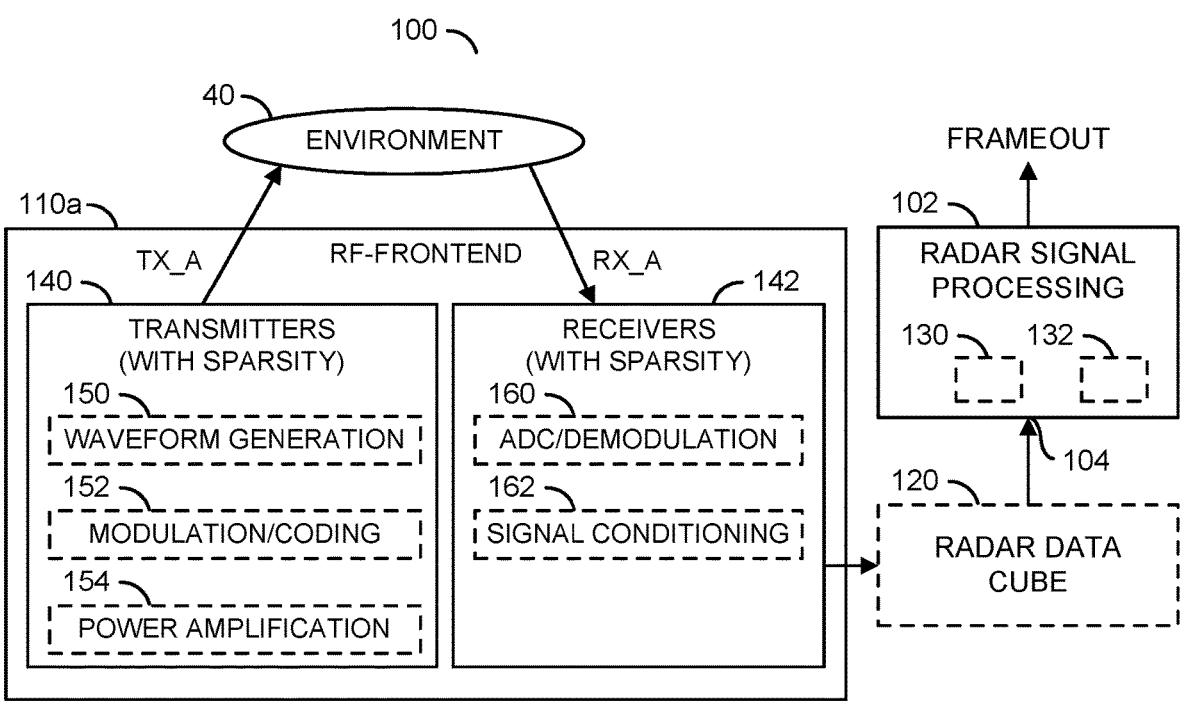
FIG. 2 is a block diagram illustrating an example embodiment of a radar system with sparse antennas and a processing chain.

Referring to FIG. 2, a block diagram illustrating an example embodiment of a radar system with sparse antennas and a processing chain is shown. The apparatus 100 is shown comprising the centralized processing device 102 and/or the radar frontend 110a. The radar frontend 110a may be configured to transmit data to and/or receive data from the environment 40. The radar frontend 110a may be configured to communicate with the centralized processing device 102 via the data network 52. A radar data cube 120 is shown generated by the radar front end 120. The radar data cube 120 may be presented to the centralized processing device 102.

In the example shown, the apparatus 100 may comprise the centralized processing device 102 and one of the radar frontends 110a-110n. The STMS data integration and/or radar signal processing implemented by the apparatus 100 may be performed with the single radar frontend 110a, as shown. While the single radar frontend 110a implementation is shown as an illustrative example, the STMS data integration and/or radar signal processing may be implemented similarly with any number of the radar frontends 110a-110n. For example, the apparatus 100 implementing the centralized radar architecture shown in association with FIG. 1 may be compatible with the single radar frontend 110a and/or extended to any number of the radar frontends 110a-110n. Generally, any type of radar frontends 110a-110n may be implemented with the apparatus 100. Assuming that the radar frontends 110a-110n may handle any thermal requirements of generating a continuous stream of raw radar data, the centralized processing device 102 may perform the processing.

The centralized processing device 102 may comprise a block (or circuit) 130 and/or a block (or circuit) 132. The circuit 130 may implement a processor. The circuit 132 may implement a memory. The centralized processing device 102 may comprise other components (not shown). The number, type and/or arrangement of the components of the centralized processing device 102 may be varied according to the design criteria of a particular implementation.

Each of the radar frontends 110a-110n may comprise a block (or circuit) 140 and/or a block (or circuit) 142. The circuit 140 may implement a transmitter. The circuit 142 may implement a receiver. The radar frontends 110a-110n may comprise other components (not shown). The number, type and/or arrangement of the components of the radar frontends 110a-110n may be varied according to the design criteria of a particular implementation.

The transmitters 140 of the radar frontends 110a-110n may be configured to generate respective signals (e.g., TX_A-TX_N). In the example with the single radar frontend 110a, only the signal TX_A is shown, for illustrative purposes. The signals TX_A-TX_N may be output signals transmitted to the environment 40. In an example, each of the signals TX_A-TX_N may be a probe signal. Each of the probe signals TX_A-TX_N generated may comprise individual waveform characteristics. In an example, a first probe signal TX_A generated by the transmitter 140 of the radar frontend 110a may comprise a first distinct (or unique or predefined) waveform characteristic, then a second probe signal TX_A generated by the transmitter 140 of the radar frontend 110a may comprise a second distinct (or unique or predefined) waveform, etc. In some embodiments, each of the probe signals TX_A-TX_N may cycle through a predefined set of a number of distinct waveform characteristics. In some embodiments, each of the probe signals TX_A-TX_N may comprise the same waveform characteristic during the same timeframe (e.g., at a first timeframe, each of the probe signals TX_A-TX_N may emit the first waveform characteristic from different edge sites to the environment 40, then at a second timeframe, each of the probe signals TX_A-TX_N may emit the second waveform characteristic from different edge sites to the environment 40, etc.). The types of the probe signals TX_A-TX_N generated may be varied according to the design criteria of a particular implementation.

The transmitters 140 may each comprise a block (or circuit) 150, a block (or circuit) 152 and/or a block (or circuit) 154. The block 150 may implement a waveform generation module. The block 152 may implement a modulation/coding module. The block 154 may implement a power amplification module. The transmitters 140 may each comprise other components (not shown). The number, type and/or arrangement of the components of the transmitters 140 may be varied according to the design criteria of a particular implementation.

The waveform generation module 150 may be configured to generate the probe signals TX_A-TX_N comprising the various waveform characteristics. The modulation/coding module 152 may be configured to select a communication frequency for the waveform characteristics for the probe signals TX_A-TX_N. In an example, the modulation/coding module 152 may select a high frequency carrier signal and/or channel for communicating the probe TX_A-TX_N. The power amplification module 154 may be configured to provide a power level for the probe signals TX_A-TX_N. For example, in response to the power level selected by the power amplification module 154 and the frequency selected by the modulation/coding module 152, the waveform generation module 150 may output the probe signals TX_A-TX_N from the transmitters 140 with the distinct waveform characteristics.

The receivers 142 of the radar frontends 110a-110n may be configured to receive respective signals (e.g., RX_A-RX_N). In the example with the single radar frontend 110a, only the signal RX_A is shown, for illustrative purposes. The signals RX_A-RX_N may be input signals received from the environment 40. In an example, each of the probe signals TX_A-TX_N may be reflected back from objects in the environment 40 and received as the reflected signals RX_A-RX_N. The receivers 142 may be configured to perform various operations on the reflected signals RX_A-RX_N. For example, the operations performed by the receivers 142 may enable the various waveform characteristics of the transmitted signals TX_A-TX_N to be extracted and/or isolated in the reflected signals RX_A-RX_N. The reflected signals RX_A-RX_N may correspond to the waveform characteristics of the probe signals TX_A-TX_N.

The receivers 142 may be configured to generate a radar data cube 120. The radar data cube 120 may comprise raw radar data generated by the receivers 142. The operations performed by the receivers 142 may be configured to generate the raw radar data of the radar data cube 120 in response to the reflected signals RX_A-RX_N. Generally, the radar data cube 120 may comprise a low volume of data. For example, the low volume of data of the radar data cube 120 may be enabled because of the sparsity of the antenna arrays of the transmitters 140 and the receivers 142. In one example, the antenna arrays implemented by the transmitters 140 and/or the receivers 142 implementing the sparse antenna array may comprise twelve antenna heads. The raw radar data of the radar data cube 120 may be transmitted to the data network 52. Each of the radar frontends 110a-110n may each generate a respective one of the radar data cubes 120 (e.g., during a data acquisition time).

The receivers 142 may each comprise a block (or circuit) 160 and/or a block (or circuit) 162. The block 160 may implement an analog to digital conversion (ADC) and/or demodulation module. The block 162 may implement a signal conditioning module. The receivers 142 may each comprise other components (not shown). The number, type and/or arrangement of the components of the receivers 142 may be varied according to the design criteria of a particular implementation.

The ADC and/or demodulation module 160 may be configured to perform analog to digital conversion and/or demodulation operations on the reflected signals RX_A-RX_N. The ADC operations may comprise sampling and/or quantization in order to convert the analog reflected signals RX_A-RX_N to a digital version that may be operated on digitally. The demodulation operations may be configured to retrieve the waveform characteristics from the reflected signals RX_A-RX_N that may have been adapted to a particular transmission channel. In an example, the demodulation operations may extract and/or isolate the waveform characteristics in the reflected signals RX_A-RX_N (e.g., the unique characteristics that correspond to the probe signals TX_A-TX_N). The signal conditioning module 154 may be configured to prepare the reflected signals RX_A-RX_N for communication via the data network 52. For example, in response to waveform characteristics extracted from the reflected signals RX_A-RX_N by the demodulation module 160, the signal conditioning module 162 may output the raw radar data from the receivers 142.

In the example shown, each of the transmitters 140 and/or the receivers 142 implemented by the radar frontends 110a-110n may implement sparsity. For example, each of the radar frontends 110a-110n may comprise the transmitters 140 and/or the receivers 142 without implementing a local memory and/or a local processor. For example, each of the radar frontends 110a-110n may generate the raw radar data with the low data volume, and rely on the centralized processing device 102 to generate the high resolution data from the raw radar data.

In some embodiments, not all of the radar frontends 110a-110n of the apparatus 100 may implement sparsity. In an example, one or more of the radar frontends 110a-110n may be implemented without sparsity. In the example with one or more of the radar frontends 110a-110n implemented without sparsity, each of the radar frontends 110a-110n that do not implement sparsity may generate a high volume of raw radar data. For example, the volume of data in the raw radar data radar data cube 120 generated with sparsity may be less than the high volume of the raw radar data generated without sparsity (e.g., by a factor of sixteen).

In another example, one or more of the radar frontends 110a-110n may be implemented with local memories and/or local processors. The local processors implemented by the radar frontends 110a-110n may analyze the high volume of raw radar data generated by the receivers 142 (without sparsity) and determine radar detections. The local processors implemented by the radar frontends 110a-110n may comprise a high volume of data that may be communicated over the data network 52. Generally, the apparatus 100 may be implemented with each of the radar frontends 110a-110n implemented with sparsity and the centralized processing device 102 may receive the low volume raw radar data cube

120 communicated over the data network 52. However, in some embodiments, the centralized processing device 102 may be configured to be backwards compatible and/or operate as an aftermarket addition to the vehicle 50 that may be configured to also work with a high volume of raw radar data generated by radar devices that do not implement sparsity and/or radar devices that implement local memories and local processors that provide radar detection output. In some embodiments, the apparatus 100 may comprise a data sparsification module that may be installed in the radar frontends 110a-110n that may convert raw radar data without sparsity to raw radar data with sparsity before the data is sent to the data network 52, which may be described in association with U.S. application Ser. No. 18/129,834, filed on Apr. 1, 2023, appropriate portions of which are incorporated by reference.

The processor 130 and/or the memory 132 of the centralized processing device 102 may be configured to perform radar signal processing. The radar signal processing may be performed in a temporal domain and/or spatial domain. The centralized processing device 102 may generate a signal (e.g., FRAMEOUT). The signal FRAMEOUT may comprise frame output data. The frame output data may comprise a range, Doppler, angle, etc. The frame output data in the output signal FRAMEOUT may be generated in response to the radar signal processing performed on the radar data cube 120.

In some embodiments, the output signal FRAMEOUT may be generated by the processor 130 and presented externally (e.g., presented to another device and/or application). In some embodiments, the output signal FRAMEOUT may be generated by the processor 130 and used internal to the centralized processing device 102. For example, the output signal FRAMEOUT may be used internally for centralized deep sensor fusion in combination with computer vision analysis performed by the centralized processing device 102 on the video data generated by the camera systems 54a-54n and/or other sensor data. In another example, the output signal FRAMEOUT may be used internally to perform dynamic resource allocation and/or dynamic scheduling of the centralized processing device 102. In yet another example, the output signal FRAMEOUT may be used internally by the centralized processing device 102 to analyze a radar output mapping of the environment 40. The usage of the output signal FRAMEOUT may be varied according to the design criteria of a particular implementation. Details of the centralized processing device 102 may be described in association with U.S. application Ser. No. 18/129,834, filed on Apr. 1, 2023, appropriate portions of which are incorporated by reference.

The centralized processing device 102 and/or the processor 130 may be configured to execute computer readable instructions. In response to executing the computer readable instructions, the processor 130 may be configured to perform a number of steps. The centralized processing device 102 may be configured to receive the continuous stream of raw radar from the radar frontends 110a-110n (e.g., at the radar data interface 104). For example, the receivers 142 may communicate the low volume raw radar data cube 120 to the data network 52 and the centralized processing device 102 may receive the raw radar data cube 120 from the data network 52.

The processor 130 may be configured to process one of the radar data cubes 120 from the raw radar data during a first time frame and process another one of the radar data cubes 120 from the raw radar data during a second time frame. The processor 130 may be configured to perform a continuous interleaving of radar data cubes 120 as the raw radar data are received. The processor 130 may generate the frame output data signal FRAMEOUT for a first one of the data cubes 120 based on the radar signal processing. The processor 130 may generate the frame output data signal FRAMEOUT for a next one of the data cubes 120 based on the continuous interleaving of the radar data cubes 120.

Each subsequent data cube 120 may be interleaved with the previous data cube 120. The processor 130 may utilize an equivalency of the subsequent data cubes 120 from the interleaving to derive the frame output data along with a limited variation between the subsequent data cubes 120 to generate the frame output data signal FRAMEOUT. The processor 130 may be configured to generate high resolution radar data based on virtual aperture imaging. The high resolution radar data may provide radar detections.

In some embodiments, the processor 130 may implement one or more coprocessors, cores and/or chiplets. For example, the processor 130 may implement one coprocessor configured as a general purpose processor and another coprocessor configured as a video processor. In some embodiments, the processor 130 may implement a dataflow vector processor. In some embodiments, the processor 130 may be a dedicated hardware module designed to perform particular tasks. In an example, the processor 130 may implement an AI accelerator. In another example, the processor 130 may implement a radar processor. In some embodiments, other processors implemented by the apparatus 100 and/or the centralized processing device 102 may be generic processors and/or video processors (e.g., a coprocessor that is physically a different chipset and/or silicon from the radar signal processing). In one example, the processor 130 may implement an x86-64 instruction set. In another example, the processor 130 may implement an ARM instruction set. In yet another example, the processor 130 may implement a RISC-V instruction set. The number of cores, coprocessors, the design optimization and/or the instruction set implemented by the processor 130 may be varied according to the design criteria of a particular implementation.

The memory 132 implemented by the centralized processing device 102 may provide data storage for the apparatus 100. The memory 132 may be configured to store the computer readable instruction that may be executed by the processor 130. The memory 132 may be configured to store video data, the raw radar data cubes 120, high resolution radar detections and/or sensor output. The memory 132 may provide volatile and/or non-volatile storage. The memory 132 may provide mass data storage. The memory 132 may comprise embedded memory and/or removable storage. In an example, the memory 132 may implement a cache. In another example, the memory 132 may implement a SD card (or microSD card). The memory 132 may be configured to store training data for an AI model. The type and/or capacity of the memory 132 may be varied according to the design criteria of a particular implementation.

The combination of the memory 132 and/or the processor 130 of the centralized processing device 102 may enable the radar frontends 110a-110n to be implemented with no individual local processors and/or no individual local memories. The processor 130 of the centralized processing device 102 may provide more processing capabilities than a local processor that may be implemented by each edge radar device that does not implement the apparatus 100. Similarly, the memory 132 of the centralized processing device 102 may provide more memory capacity than a local memory that may be implemented by each radar device that does not implement the centralized radar architecture of the apparatus 100. In one example, the centralized processing device 102 may be configured to provide a processing bandwidth of approximately 1.3G (ADC samples/s) compared to a typical local processor (e.g., implemented at the edge sites with the radar frontends 110a-110n) that may provide a processing bandwidth of 31M (ADC samples/s). In another example, the centralized processing device 102 may comprise approximately 32 GB of memory (or more) compared to a typical memory of a local processor (e.g., implemented at the edge sites with the radar frontends 110a-110n) that may provide approximately 8 MB of memory. The centralized processing device 102 may be configured to be implemented on modern technology and/or fabrication nodes. In an example, the centralized processing device 102 may be implemented on a 5 nm technology node, while a local processor may be limited to a technology node used for the radar transceiver (e.g., the local processors may not be optimized for digital processing and may be constrained by technology used for RF processing).

The centralized processing device 102 may be configured to perform centralized virtual aperture imaging (CVAI). The centralized processing device 102 may be configured to receive the low volume raw radar data cubes 120 from each of the radar frontends 110a-110n. The CVAI may be configured to perform virtual aperture imaging for reconstructing high resolution detections based on the each of the raw radar data cubes 120. The virtual aperture imaging may be configured to use the waveform characteristics in the raw radar data cubes 120 in order to generate physical antenna data, extrapolated virtual antenna data and/or interpolated virtual antenna data. For example, the virtual aperture imaging may enable additional data points (e.g., the extrapolated virtual antenna data and/or the interpolated virtual antenna data) to be generated in order to provide a high resolution of data based on the sparse physical antenna data. The virtual aperture imaging may enable a dense array of virtual antenna data to be provided in response to the sparse arrangement of the physical antennas implemented by one of the radar frontends 110a-110n. Details of the virtual aperture imaging may be described in association with U.S. application Ser. No. 18/129,834, filed on Apr. 1, 2023, U.S. application Ser. No. 17/832,278 filed on Jun. 3, 2022 (issued as U.S. Pat. No. 11,561,299), U.S. application Ser. No. 17/556, 221 filed on Dec. 20, 2021, U.S. application Ser. No. 16/704,409, filed Dec. 5, 2019 (issued as U.S. Pat. No. 11,243,304), U.S. application Ser. No. 16/503,908, filed Jul. 5, 2019 (issued as U.S. Pat. No. 10,564,277), U.S. application Ser. No. 16/032,369, filed Jul. 11, 2018 (issued as U.S. Pat. No. 10,509,119), and U.S. application Ser. No. 15/883, 372, filed Jan. 30, 2018 (issued as U.S. Pat. No. 10,048,366), appropriate portions of which are incorporated by reference.

Figure 3:
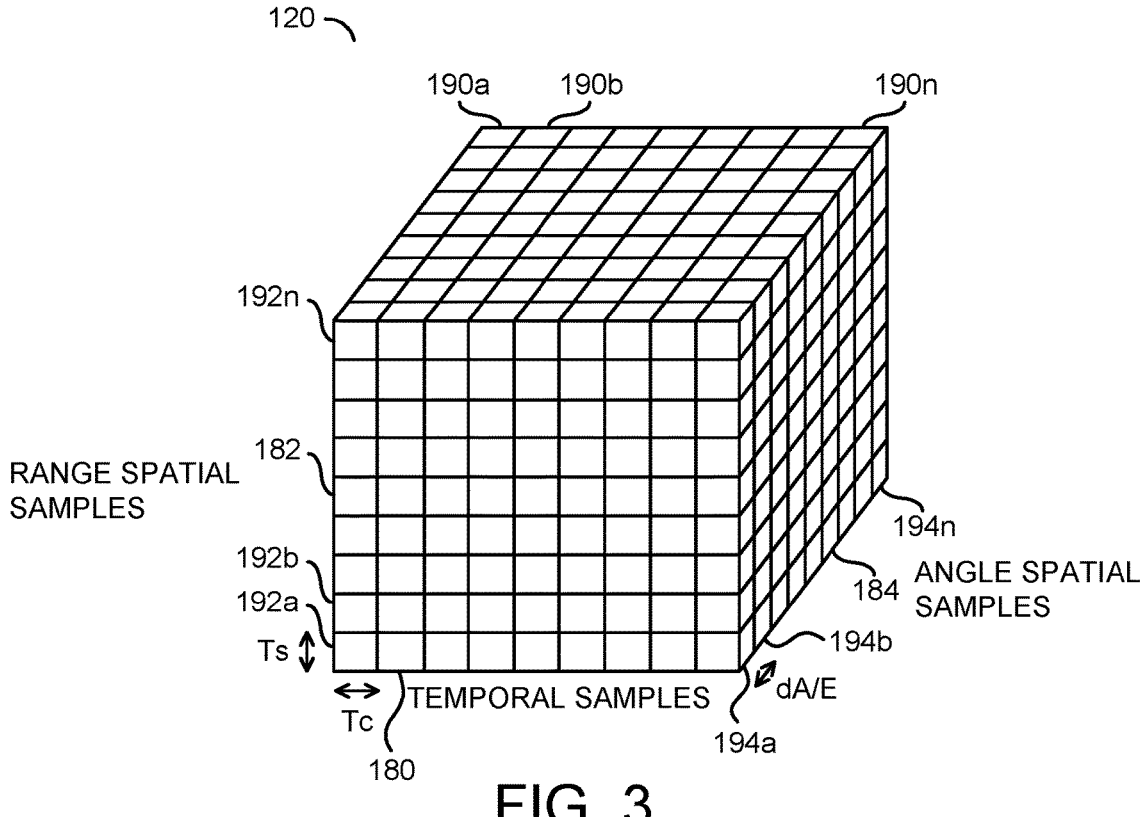
FIG. 3 is a diagram illustrating an example data cube.

Referring to FIG. 3, a diagram illustrating an example data cube is shown. The radar data cube 120 is shown. The frame output data FRAMEOUT may be a result of the processed data cube. For example, the radar data cube 120 may comprise the raw radar data generated by one of the radar frontends 110a-110n and the frame output data FRAMEOUT may be generated in response to processing the raw data. The radar data cubes 120 processed by the apparatus 100 may have a large size generated in response to a continuous stream of the raw radar data. In some embodiments, the radar data cubes 120 processed by the apparatus 100 may have a variable size.

The radar data cube 120 may conceptually represent space-time processing of the raw radar data generated by the radar frontends 110a-110n. For example, the processor 13 may be configured to convert the RF signals received from multiple pulses across multiple array elements to complex-valued baseband samples and then arrange the complex-valued baseband samples in a multi-dimensional array represented by the radar data cube 120. In some embodiments, the radar data cube 120 may comprise a 4D data cube in measurement space. The centralized processing device 102 may be configured to perform a Fast Fourier Transform operation to convert the radar data cube 120 from measurement space to physical unit space. The centralized processing device 102 may be configured to perform the radar signal processing operations on the radar data cube 120 in the measurement space and/or in the physical unit space.

The radar data cube 120 may comprise an axis 180, an axis 182 and/or an axis 184. The axis 180 may comprise a first dimension of the 4D data cube 120. The axis 182 may comprise a second dimension of the 4D data cube 120. The axis 184 may comprise a third dimension and a fourth dimension of the 4D data cube 120. In the measurement space, the axis 180 may comprise temporal samples. In the physical unit space, the axis 180 may comprise Doppler samples. In the measurement space and/or the physical unit space, the axis 182 may comprise range spatial samples. In the measurement space, the axis 184 may comprise azimuth/elevation spatial samples (K/L antennas). In the physical unit space, the axis 184 may comprise azimuth/elevation spatial samples (degrees/degrees).

The axis 180 may comprise a number of samples 190a-190n. The number of samples 190a-190n may each comprise a number of samples from a single pulse (or chirp) received at a single array element. In the measurement space, the number of samples 190a-190n may each comprise a temporal sample interval Tc. The number of samples 190a-190n may provide N samples per frame. In the physical unit space, the number of samples 190a-190n may each comprise one frame (measured in meters per second). With a fixed temporal sample interval Tc, the size of the axis 180 may determine separability (e.g., larger number N of the samples 190a-190n may provide a better Doppler resolution). The density of the axis 180 (e.g., the sampling size Tc of each of the number of samples 190a-190n) may determine the maximum velocity. For example, a smaller sample size Tc may result in a larger maximum velocity.

The axis 182 may comprise a number of samples 192a-192n. The number of samples 192a-192n may each comprise complex-valued baseband samples from a single pulse (or chirp). In the measurement space, the number of samples 192a-192n may comprise a sampling rate Ts. Generally, the sampling rate Ts may be selected to avoid aliasing. The number of samples 192a-192n may provide M samples. In the physical unit space, the number of samples 192a-192n may comprise a range in meters. With a fixed sampling rate Ts, the size of the axis 182 may determine separability (e.g., larger number M of the samples 192a-192n may provide better range resolution). The density of the axis 182 (e.g., the sampling rate Ts of each of the number of samples 192a-192n) may determine the maximum range. For example, a smaller sampling rate Ts may result in a larger maximum range.

The axis 184 may comprise a number of samples 194a-194n. The number of samples 194a-194n may each comprise complex-valued baseband samples from L different pulses (or chirps). In the measurement space, the number of samples 194a-194n may comprise azimuth/elevation antenna spacing dA/E. The number of samples 194a-194n may provide the azimuth/elevation spatial samples K/L antennas. In the physical unit space, the number of samples 192a-192n may comprise the azimuth/elevation spatial samples in degrees/degrees. The size of the of the axis 184 may determine separability (e.g., a larger K/L may provide better angle resolution). The density of the axis 194 (e.g., the dA/E of each of the number of samples 194a-194n) may determine the field of view. For example, a smaller dA/E may result in a larger angle/elevation field of view.

Generally, a homogeneity of the radar data cube 120 may determine a radar signal quality. More homogeneous data may provide better radar quality (e.g., smaller side lobes and ripples). If the data cubes 120 are each processed locally at the radar frontends 110a-110n, there may be an inherent conflict between Doppler resolution and the output frame rate for the frame output data FRAMEOUT. For example, with local processing at the radar frontends 110a-110n each data cube may be acquired and then processed before a next data cube may be acquired (e.g., an output frame rate may be inversely proportional to a frame interval). The conflict between Doppler resolution and the output frame rate may be a result of having a fixed processing time and the relationship between a larger N of the samples 190a-190n resulting in a larger frame interval, a larger frame interval resulting in a smaller output frame rate, which results in a small radar output volume throughput. Processing each of the data cubes locally at the radar frontends 110a-110n may result in data cube snapshots that have significant angle information difference and uncoherence.

The apparatus 100 may be configured to resolve the conflict between Doppler resolution and output frame rate (e.g., the resolution of frame output data being proportional to a size of the data cube processed and an output rate of the frame output data being inversely proportional to the size of the data cube processed). The apparatus 100 may be configured to receive a continuous stream of raw radar data from the radar frontends 110a-110n and interleave the raw radar data between subsequent data cubes. Interleaving the raw radar data in the data cubes 120 may provide continuous multi-look angle diversity. There may be limited variability between the subsequent data cubes, which may provide a coherency between for each data cube 120. In the phase domain, the different segments of each data cube 120 may be acquired from the continuous stream of the raw radar data in order to be coherent. By implementing the centralized processing device 102 to receive the continuous stream of the raw radar data, each data cube 120 processed may be coherent.

Figure 4:
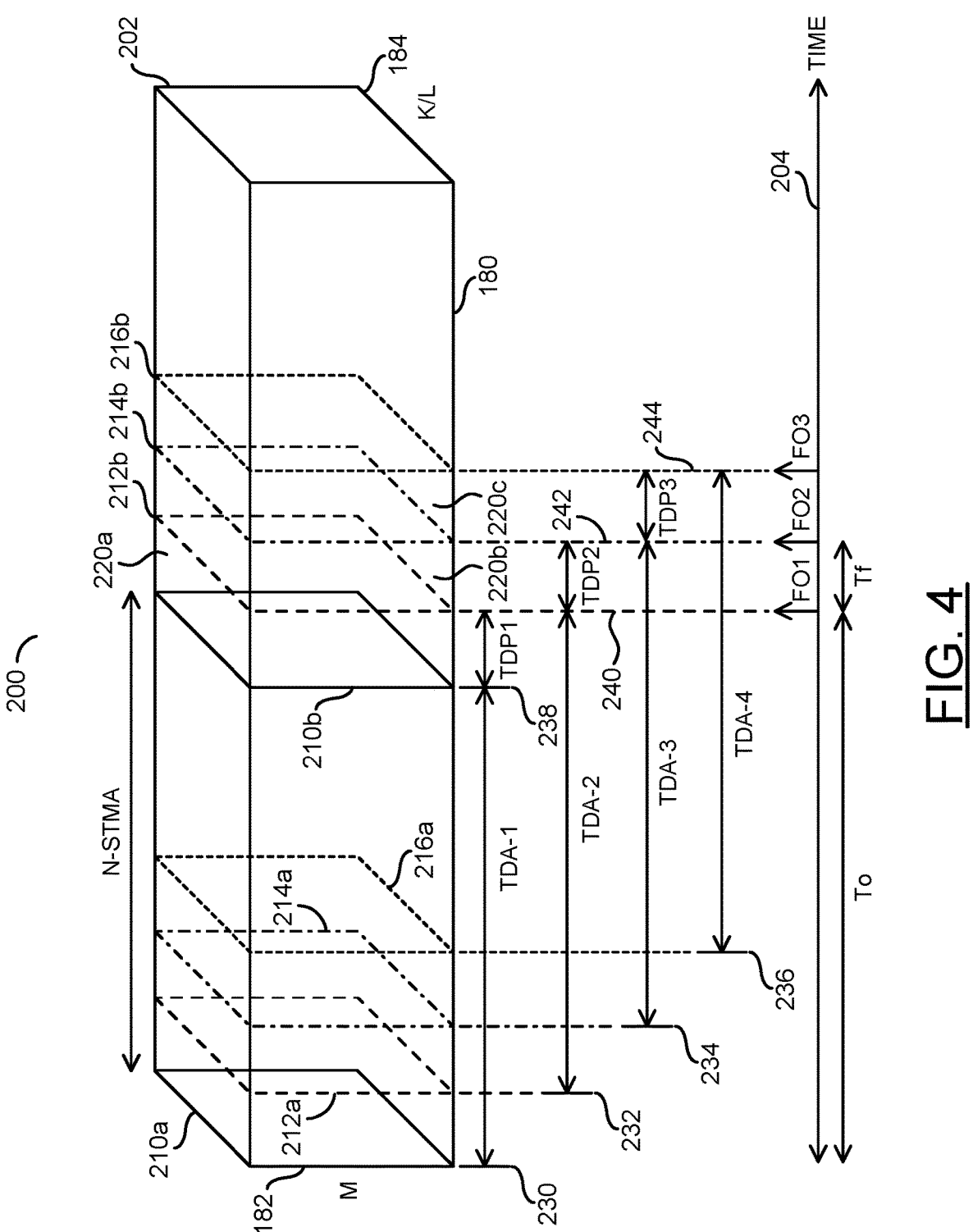
FIG. 4 is a diagram illustrating continuous data acquisition and streaming using spatial temporal multi-snapshot radar processing.

Referring to FIG. 4, a diagram illustrating continuous data acquisition and streaming using spatial temporal multi-snapshot radar processing is shown. A data acquisition example 200 is shown. The data acquisition example 200 may provide an example of spatial temporal multi-snapshot radar processing of multiple data cubes. In the data acquisition example 200 the data cubes may have a fixed data cube size.

The data acquisition example 200 may comprise a continuous stream of raw radar data 202 and a double-ended arrow 204. The data acquisition example 200 may illustrate the continuous stream of raw radar data 202 generated by one of the radar frontends 110a-110n. The double-ended arrow 204 may represent a timeline. The radar frontends 110a-110n may acquire data and continuously stream the raw radar data over the data network 52. The radar data interface 104 may receive the continuous stream of raw radar data 202. The centralized processing device 102 may receive the continuous stream of raw radar data 202 from the radar data interface 104. The processor 130 may arrange and/or interpret the continuous stream of raw radar data 202 as the data cube 120. In the example shown, the continuous stream of raw radar data 202 may comprise the temporal samples axis 180, the range spatial samples axis 182 and the azimuth/elevation spatial samples axis 184.

The continuous stream of raw radar data 202 may comprise a number of data cubes 120. The processor 130 may be configured to process the continuous stream of raw radar data 202 as a number of coherent data cubes 120. A data cube start 210a and a data cube end 210b may be a first data cube 210a-210b of the continuous stream of raw radar data 202. A data cube start 212a and a data cube end 212b may be a next (e.g., second) data cube 212a-212b of the continuous stream of raw radar data 202. A data cube start 214a and a data cube end 214b may be a next (e.g., third) data cube 214a-214b of the continuous stream of raw radar data 202. A data cube start 216a and a data cube end 216b may be a next (e.g., fourth) data cube 216a-216b of the continuous stream of raw radar data 202. In the example shown, four of the data cubes 212a-216b are shown as an illustrative example. The apparatus 100 may be configured to process any number of data cubes in the continuous stream of raw radar data 202. For example, the number of data cubes 120 processed may be based on a size of the data cubes and/or an amount of the raw radar data 202 received. The number of data cubes generated from the continuous stream of raw radar data 202 may be varied according to the design criteria of a particular implementation.

In the data acquisition processing for fixed sized data cubes example 200 shown, the centralized processing device 102 may perform the STMS data integration and/or signal processing in the time domain. The first data cube 210a-210b is shown having a temporal spatial domain size of N-STMA. Each of the first data cube 210a-210b, the second data cube 212a-212b, the third data cube 214a-214b and the fourth data cube 216a-216b may have the temporal spatial domain size of N-STMA for the fixed data cube size example 200. The temporal spatial domain size of N-STMA may be significantly larger than a temporal spatial domain size N of a data cube that may be generated by a local processor implemented by the radar frontends 110a-110n. For example, the powerful processing capability of the centralized processing device 102 may enable processing the large temporal spatial domain size N-STMA. Having the large temporal spatial domain size N-STMA for the data cubes 120 may provide a high Doppler resolution, which may provide a high signal to noise ratio. Performing the STMS data integration and/or radar signal processing in the other spatial domains may result in the data cubes having significantly larger range spatial domain sizes and/or angle spatial domain sizes.

Portions of the first data cube 210a-210b, the second data cube 212a-212b, the third data cube 214a-214b and the fourth data cube 216a-216b may overlap with each other. Generally, the portions of the first data cube 210a-210b, the second data cube 212a-212b, the third data cube 214a-214b and the fourth data cube 216a-216b that overlap may have the same raw radar data. Variation portions 220a-220c are shown. The variation portion 220a may illustrate a portion of the second data cube 212a-212b that does not overlap with the first data cube 210a-210b. The variation portion 220b may illustrate a portion of the third data cube 214a-214b that does not overlap with the second data cube 212a-212b. The variation portion 220c may illustrate a portion of the fourth data cube 216a-216b that does not overlap with the third data cube 214a-214b. The variation portions 220a-220c may illustrate the portions of the data cubes that are different from the previous one of the data cubes. The size of the variation portions 220a-220c may be much smaller than the size of the data cubes (e.g., the variation portions 220a-220c may be much smaller than the temporal spatial domain size N-STMA).

Vertical lines 230-244 are shown. The vertical lines 230-244 may correspond to times on the timeline 204. The time 230 may correspond to the starting end 210a of the first data cube 210a-210b. The time 232 may correspond to the starting end 212a of the second data cube 212a-212b. The time 234 may correspond to the starting end 214a of the third data cube 214a-214b. The time 236 may correspond to the starting end 216a of the fourth data cube 216a-216b. The time 238 may correspond to the ending end 210b of the first data cube 210a-210b. The time 240 may correspond to the ending end 212b of the second data cube 212a-212b. The time 242 may correspond to the ending end 214b of the third data cube 214a-214b. The time 244 may correspond to the ending end 216b of the fourth data cube 216a-216b.

The first data cube 210a-210b may have a data acquisition time TDA-1 starting from the time 230 until the time 238. The second data cube 212a-212b may begin data acquisition after the first data cube 210a-210b begins data acquisition and may have a data acquisition time TDA-2 from the time 232 until the time 240. In an example, the data acquisition time TDA-2 may (partially) overlap with the data acquisition time TDA-1. The third data cube 214a-214b may begin data acquisition after the second data cube 212a-212b begins data acquisition and may have a data acquisition time TDA-3 from the time 234 until the time 242. In an example, the data acquisition time TDA-3 may (partially) overlap with the data acquisition time TDA-2. The fourth data cube 216a-216b may begin data acquisition after the third data cube 214a-214b begins data acquisition and may have a data acquisition time TDA-4 from the time 236 until the time 244. In an example, the data acquisition time TDA-4 may (partially) overlap with the data acquisition time TDA-3. The data acquisition time TDA-1, the data acquisition time TDA-2, the data acquisition time TDA-3 and the data acquisition time TDA-4 may be equivalent lengths of time, but may start at different points on the timeline 204.

The processor 130 may be configured to interleave a current one of the data cubes with the previous data cube. For example, the overlapping portions of the first data cube 210a-210b and the second data cube 212a-212b may be interleaved, the overlapping portions of the second data cube 212a-212b and the third data cube 214a-214b may be interleaved, and the overlapping portions of the third data cube 214a-214b and the fourth data cube 216a-216b may be interleaved. In the example shown, each of the fourth data cube 216a-216b and the third data cube 214a-214b may also be interleaved with the first data cube 210a-210b. However, for radar signal processing, the processor 130 may interleave the current data cube with the one previous data cube (e.g., without regard for all previous data cubes). For example, eventually, the continuous stream of raw radar data 202 may comprise raw radar data that does not overlap with the first data cube 210a-210b.

The processor 130 may perform the radar signal processing by sliding the data cubes in a distance much smaller than the size of the data cubes. For example, between the first data cube 210a-210b and the second data cube 212a-212b, the data cube may slide the distance of the variation 220a, which is much smaller than the temporal spatial domain size of N-STMA. The first data cube 210a-210b and the second data cube 212a-212b may be interleaved from the time 232

(e.g., when data acquisition begins for the current data cube) until the time 238 (e.g., when data acquisition ends for the previous data cube).

A data processing time TDP1 for the first data cube 210a-210b is shown. The data processing time TDP1 may begin when all of the data for the first data cube 210a-210b has been received at the time 238. The data processing time TDP1 may be from the time 238 until the time 240. A frame output FO1 is shown at the time 240. The frame output FO1 may be the frame output data FRAMEOUT for the first data cube 210a-210b. A data processing time TDP2 for the second data cube 212a-212b is shown. The data processing time TDP2 may begin when all of the data for the second data cube 212a-212b has been received at the time 240. The data processing time TDP2 may be from the time 240 until the time 242. A frame output FO2 is shown at the time 242. The frame output FO2 may be the frame output data FRAMEOUT for the second data cube 212a-212b. A data processing time TDP3 for the third data cube 214a-214b is shown. The data processing time TDP3 may begin when all of the data for the third data cube 214a-214b has been received at the time 242. The data processing time TDP3 may be from the time 242 until the time 244. A frame output FO3 is shown at the time 244. The frame output FO3 may be the frame output data FRAMEOUT for the third data cube 214a-214b.

The frame output data FO1 is shown on the timeline 204 at the time 240. A double ended arrow $T_o$ is shown. The double ended arrow $T_o$ may extend from the time 230 when the data acquisition time TDA-1 for the first data cube 210a-210b begins until the time 240 when the frame output data FO1 is generated. The time $T_o$ may be an output latency when using the fixed data cube sizes. A double ended arrow Tf is shown. The double ended arrow Tf may extend from the time 240 when the first frame output data FO1 is generated until the time 242 when the second frame output data FO2 is generated. The time Tf may be a frame interval when using fixed data cube sizes. In the example shown, the frame interval Tf may be the same as the data processing times TDP1-TDP3. The frame interval Tf may be the same length between the second frame output data FO2 and the third frame output data FO3 (e.g., and each subsequent frame output data). The frame interval Tf may be much smaller than the output latency $T_o$. For example, using the fixed data cube sizes, the apparatus 100 may have a relatively large output latency $T_o$ in order to generate the first frame data output FO1 and then relatively short frame intervals Tf between each subsequent frame data output (e.g., FO2-FON).

Each data frame may be processed by the processor 130. The data output rate may depend on a data processing times TDP1-TDP3 for the data cubes. The data processing time may be independent of the data acquisition times TDA-1, TDA-2, TDA-3, etc. Since the data processing time for the data cubes may be independent of the data acquisition time and dependent on the capabilities of the centralized processing device 102, the apparatus 100 may have a short frame time interval Tf. The short frame interval Tf may enable a high radar signal output frame rate, which may provide a high radar data volume throughput. The apparatus 100 may achieve high Doppler resolution and high output frame rate at the same time with better signal to noise ratio. In an example, without implementing interleaving, a frame interval Tf may be approximately 50 ms may result in an output rate of approximately 20 Hz and to achieve a 100 Hz output rate, the frame interval may be 10 ms (e.g., short), which may compromise (e.g., negatively affect) the Doppler resolution. With the apparatus 100 implementing the interleaving and/or the STMS radar signal processing, for the same frame interval Tf of 50 ms, by sliding by 10 ms in the temporal spatial domain (e.g., interleaving 40 ms of data between subsequent data cubes), the output rate may be approximately 100 Hz without compromising the Doppler resolution.

Each of the radar data cubes 210a-216b may be processed by the centralized processing device 102 in a sliding structure. Since the movement from one data cube to the next data cube may be very small (e.g., the limited size of the variations 220a-220c), there may be a small amount of difference between subsequent data cubes. In the example of interleaving in the temporal spatial domain, the variations 220a-220c may provide a small angle variable from one data cube to the next. For example, the angle information from one frame to the next may be coherent. The coherent data may enable continuous multi-snapshot data integration. In the example shown, the interleaving of the data cubes may enable continuous multi-snapshot data integration in the temporal spatial domain.

The data cubes 210a-216b may comprise different segments of the continuous stream of radar data 202. Since the first data cube 210a-210b, the second data cube 212a-212b, the third data cube 214a-214b and the fourth data cube 216a-216b may be acquired from the same continuous stream of signal, each of the data cubes may be coherent. Since the data cubes may be coherent, the frame output data from a one of the data cubes may be derived from the frame output data of the previous data cube.

The amount of movement (e.g., the difference of the variations 220a-220c) between the data cubes may be very small (e.g., relative to the size of each of the data cubes). The small difference may result in a limited variation between each subsequent data cube. Since most of the data between a current data cube (e.g., the second data cube 212a-212b) is interleaved with the data from the previous data cube (e.g., the first data cube 210a-210b), most of the frame output data for the current data cube may be derived from the neighboring (e.g., previous) data cubes. The coherently consistent data cubes may enable continuous multi-snapshot coherent data integration. For example, for the third frame output data FO3, most of the data may be derived from the interleaved portion previously calculated for the second data cube 212a-212b, which may be combined with the radar signal processing of the variation 220c.

Generally, the data processing time TDP1 may be larger than the subsequent data processing times TDP2-TDPN. For example, the frame output data FO1 for the first data cube 210a-210b may be generated without any interleaving (e.g., since there are no previous data cubes available for interleaving). From the second data cube 212a-212b and on, the interleaving may be available for the radar signal processing. The delay in generating the first frame output data FO1 may result in the delay of the output latency $T_o$. Latency may be minimized by using variable data cube sizes instead of the fixed data cube sizes, which may be described in association with FIG. 6.

For efficient processing and/or providing output with the low frame interval Tf, the frame output data for a current data cube (e.g., the data cube being processed) may be derived from the frame output data of the previous data cube (e.g., the data cube that was used to generated the most recent frame output data). For example, the processor 130 may wait until after the data processing time TDP1 before beginning the data processing time TDP2 since the results of the second data cube 212a-212b may rely on the results generated for the first data cube 210a-210b. The continuous stream of raw radar data 202 that corresponds to the second data cube 212a-212b may overlap with a significant portion of the raw radar data 202 that corresponds with the first data cube 210a-210b. Because the data is interleaved, and the continuous stream of raw radar data 202 is coherent (e.g., in the temporal spatial domain in the example shown), the output data that corresponds to the interleaved data may already be available (e.g., previously calculated and/or stored in the memory 132) for the most recent frame output data (e.g., the frame output data FO1 may be most recently completely calculated result when calculating the results for the second data cube 212a-212b). The processor 130 may perform new calculations for the variation portion 220a and then combine the previously calculated result with the result of the calculations of the variation portion 220a to derive the frame output data FO2. Each subsequent frame output data may similarly derive the result from the previously calculated result for the interleaved data and then combine with new calculations for the corresponding variation portions 220a-220n.

Figure 5:
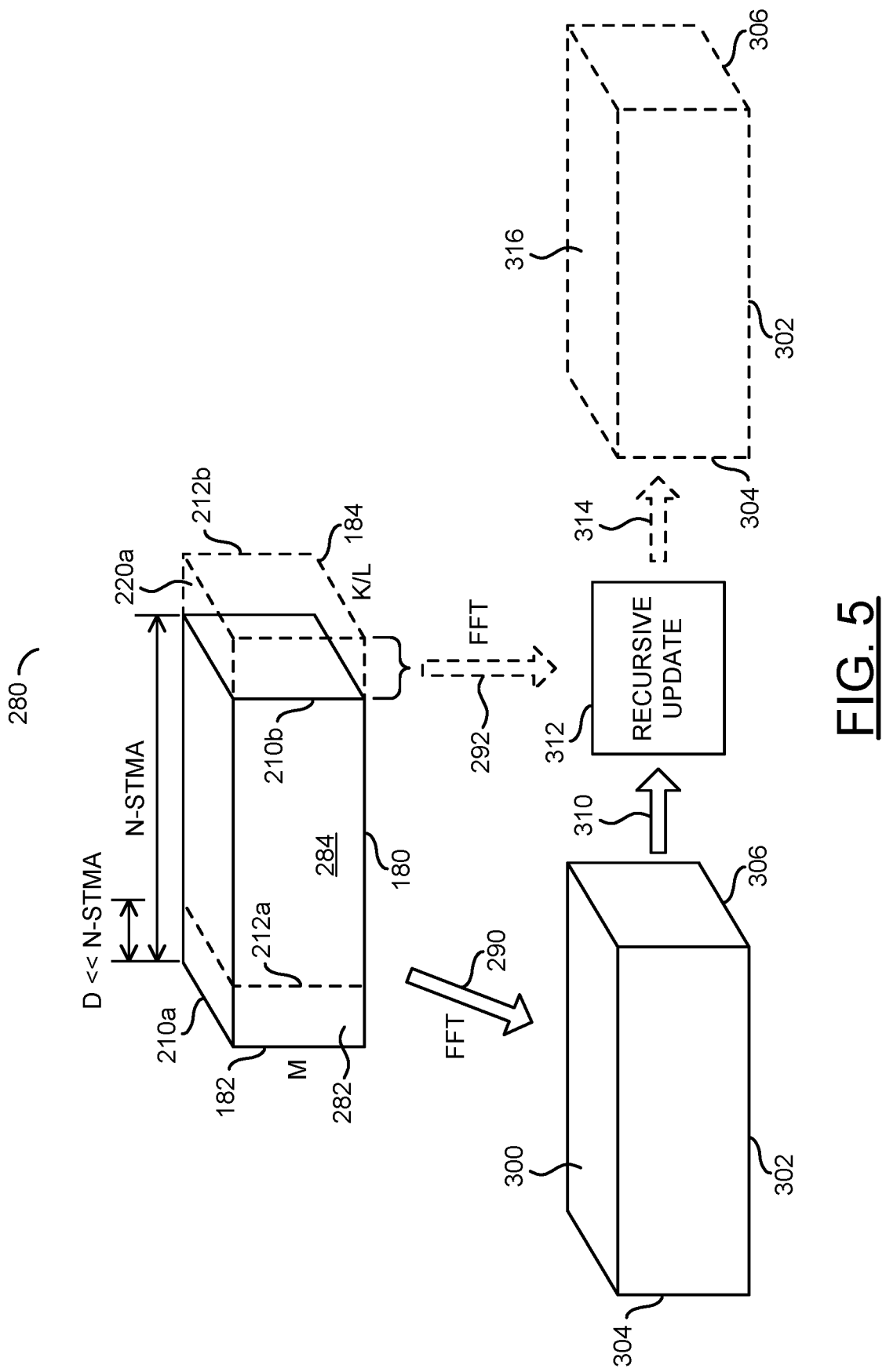
FIG. 5 is a diagram illustrating recursive updating of multi-snapshot information for spatial temporal multi-snapshot radar processing.

Referring to FIG. 5, a diagram illustrating recursive updating of multi-snapshot information for spatial temporal multi-snapshot radar processing is shown. A recursive updating example 280 is shown. The recursive updating example 280 may be an illustrative example of the SIMS radar processing by the apparatus 100. The recursive updating example 280 may enable efficient multi-snapshot information to be generated through recursive updates.

The recursive updating example 280 may comprise the first data cube 210a-210b and the second data cube 212a-212b. The first data cube 210a-210b and the second data cube 212a-212b are shown as a representative example of a previous data cube (e.g., the first data cube 210a-210b) and a current data cube (e.g., the second data cube 212a-212b). Generally, the recursive updating example 280 may be applicable to any pair of subsequent data cubes (e.g., with the previous data cube being the second data cube 212a-212b and the current data cube being the third data cube 214a-214b, with the previous data cube being the third data cube 214a-214b and the current data cube being the fourth data cube 216a-216b, etc.).

The temporal spatial axis 180, the range spatial axis 182 and the angle spatial axis 184 are shown for the first data cube 210a-210b and the second data cube 212a-212b. The variation 220a is shown as the difference radar cube data when the data cubes for the continuous stream of raw radar data 202 are interleaved in the temporal spatial domain between the first data cube 210a-210b and the second data cube 212a-212b. A non-overlapping portion 282 is shown. The non-overlapping portion 282 may be a portion of the first data cube 210a-210b acquired before data acquisition begins for the second data cube 212a-212b. A size D of the non-overlapping portion 282 is shown. The size D of the non-overlapping portion 282 may be much smaller than the size N-STMA of the first data cube 210a-210b and/or the second data cube 212a-212b in the temporal spatial domain. The size D may be the same size as the variation 220a. An interleaved portion 284 is shown. The interleaved portion 284 may be a portion of the first data cube 210a-210b and the second data cube 212a-212b that may overlap in the temporal spatial domain. The continuous raw radar data 202 may be interleaved for the first data cube 210a-210b and the second data cube 212a-212b in the interleaved portion 284. In an example, the interleaving performed by the processor 130 may enable the information in interleaved portion 284 between the first data cube 210a-210b and the second data cube 212a-212b to be equivalent.

The interleaved portion 284 may be much larger than the variation 220a. For example, a majority of the radar information from the first data cube 210a-210b may be the same as the radar information from the second data cube 212a-212b. The variation 220a may be a relatively small amount of new information in the second data cube 212a-212b. In order to generate the frame output data FO2 for the second data cube 212a-212b, the centralized processing device 102 may efficiently calculate the output data using a recursive update.

An arrow 290 and an arrow 292 are shown. The arrows 290-292 may represent a transformation operation. In one example, the transformation operations 290-292 may be a Fast Fourier Transform (FFT) operation. The FFT operation 290 may be performed by the processor 130 on the first data cube 210a-210b.

The FFT operation 292 may be performed by the processor 130 on the variation data 220a. By performing the FFT operation 292 on the variation data 220a instead of the entire second data cube 212a-212b, the FFT operation 292 may be less computationally intensive and/or involve fewer operations than the FFT operation 290.

A FFT data cube 300 is shown. The FFT data cube 300 may be a data cube in physical unit space. The FFT data cube 300 may be generated by performing the FFT operation 290 in response to the first data cube 210a-210b. The FFT data cube 300 may be a first FFT data cube 300. The first frame output data FO1 may be generated based on the first FFT data cube 300.

The first FFT data cube 300 may comprise an axis 302, an axis 304 and an axis 306. The axis 302 may comprise Doppler samples in the physical unit space. The axis 304 may comprise range spatial samples (in meters/second) in the physical unit space. The axis 306 may comprise azimuth/elevation spatial samples (in degrees/degrees) in the physical unit space.

The processor 130 may be configured to perform an operation 310, an operation 312 and an operation 314. The operation 310 may extract the coherent information from the first FFT data cube 300. The operation 312 may be a combination operation performed in the memory 132. The combination operation 312 may receive the coherent information from the first FFT data cube 300, and the new FFT information from the second data cube 212a-212b (e.g., the result of the FFT operation 292 performed on the variation data 220a). The operation 314 may be a recursive update operation. The recursive update operation 314 may generate a FFT data cube 316. The recursive update operation 314 may enable deriving the FFT data cube 316 from the previous FFT data cube 300.

The FFT data cube 316 may be generated in response to the recursive update operation 314 based on the coherent information from the first FFT data cube 300 and the FFT data from the variation data 220a. The FFT data cube 316 may be a second FFT data cube. The second FFT data cube 316 may comprise the axis 302, the axis 304 and the axis 306 (e.g., similar to the first FFT data cube 300). The second frame output data FO2 may be generated from the second FFT data cube 316.

Generating the second FFT data cube 316 may be computationally efficient compared to generating the first FFT data cube 300. For example, instead of performing the FFT operation 290 in response to all of the data from the first data cube 210a-210b and all of the data from the second data cube 212a-212b, the FFT operation 290 may be performed only in response to the all of the data from the first data cube 210a-210b. The FFT operation 292 performed on the variation data 220a may comprise fewer operations than performing the FFT operation 290 on all of the data from the second data cube 212a-212b. Performing the FFT operation 292, the extraction operation 310, the combination operation 312 and the recursive update operation 314 may be less computationally intensive than performing the FFT operation 290 on all of the data from the second data cube 212a-212b. For example, the information in the first FFT data cube 300 may be coherent with the information in the second FFT data cube 316 (e.g., a majority of the information in the first FFT data cube 300 may be preserved in the second FFT data cube 316).

Similar to the recursive updating example 280, the frame output data for the third data cube 214a-214b may be generated by performing the FFT operation 292 using the variation information 220b and the coherent information from the second FFT data cube 316 (e.g., based on the interleaving of the second data cube 212a-212b and the third data cube 214a-214b) to perform the recursive update operation 314. The recursive update operation 314 may be performed for each subsequent data cube using the variation data from the current data cube and the coherent information from the previous data cube.

The recursive updating example 280 shown may be performed in the temporal domain. The apparatus 100 may be configured to perform recursive updating of the data cube 210a-210b and the data cube 212a-212b in other domains (e.g., the range domain, the angle domain, etc.). The particular domain used for interleaving the data cubes and/or performing the recursive updating may be varied according to the design criteria of a particular implementation.

Figure 6:
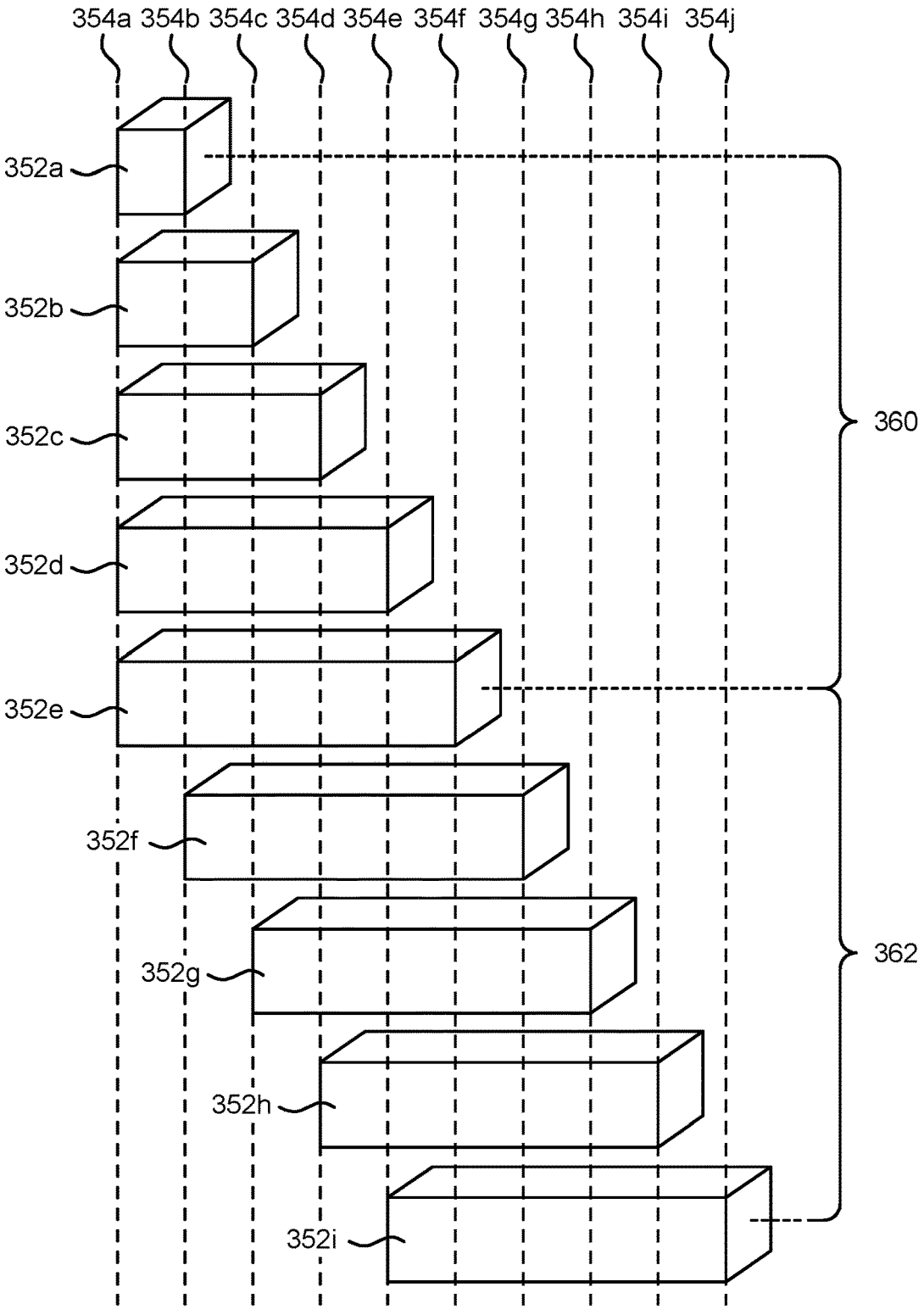
FIG. 6 is a diagram illustrating capturing variable data cube sizes for spatial temporal multi-snapshot radar processing.

Referring to FIG. 6, a diagram illustrating capturing variable data cube sizes for spatial temporal multi-snapshot radar processing is shown. A variable data cube implementation 350 is shown. The variable data cube implementation 350 may be performed by the apparatus 100 to enable the STMS radar processing with a low data latency. For example, as shown in association with FIG. 4, the first frame output data FO1 may be generated after the output latency time $T_o$. The output latency time $T_o$ may be the entire data acquisition time TDA-1 and the data processing time TDP1. Each subsequent frame output data may have the frame interval Tf by using the interleaving of the data cubes and the variations 220a-220n to derive the frame output data from previous results. However, since there is no data from a previous data cube for the first data cube 210a-210b, the output latency time $T_o$ may result in data latency for the first frame output data FO1.

The variable data cube implementation 350 may be implemented by the apparatus 100 in order to reduce the output latency time $T_o$ for the first frame output data FO1. The variable data cube implementation 350 may enable the centralized processing device 102 to perform the radar signal processing on data cubes having variable sizes. The size of the data cubes may be continuously gradually and/or iteratively increased. In one example, the size of the data cubes may be gradually increased in the temporal spatial dimension. An initial subset of the data cubes may gradually increase in size until a predetermined data cube size is reached. The processor 130 may perform the radar signal processing on each of the relatively smaller initial data cubes in order to generate the frame output data.

Since the initial data cubes may have varying, but smaller sizes, the output latency $T_o$ may be less than the output latency $T_o$ for the first data cube 210a-210b having the predetermined size. The smaller size of the initial data cubes may result in a relatively reduced Doppler resolution (e.g., the Doppler resolution may vary based on the number of temporal spatial samples 190a-190n). The variable data cube implementation 350 may provide data output faster (e.g., the reduced output latency $T_o$ compared to the fixed data cube implementation) but with a tradeoff in initial Doppler resolution (e.g., reduced Doppler resolution compared to the fixed data cube implementation). After the initial subset of the smaller size data cubes with varying size, the centralized processing device 102 may perform the radar signal processing operations on the data cubes with the predetermined size, which may result in the frame output data with the relatively higher (e.g., desired) Doppler resolution.

In the variable data cube implementation 350, a number of blocks 352a-352i are shown. The blocks 352a-352i may be the data cubes processed by the centralized processing device 102. The data cubes 352a-352i may comprise the continuous stream of raw radar data from one of the radar frontends 110a-110n. One or more of the data cubes 352a-352i may have different sizes.

Dotted vertical lines 354a-354j are shown. The dotted vertical lines 354a-354j may represent particular times. The times 354a-354j may be evenly spaced. The times 354a-354j may illustrate when the raw radar data for the data cubes 352a-352i may be received and when the frame output data may be generated in response to the data cubes 352a-352i may be output. The times 354a-354j may also correspond to the amount of temporal spatial samples of the data cubes 352a-352i. The times 354a-354j may represent the frame interval Tf.

A subset 360 and a subset 362 are shown. The subsets 360-362 may comprise subsets of the data cubes 352a-352i. The subset 360 may comprise the data cubes 352a-352e. The subset 362 may comprise the data cubes 352e-352i. The data cubes 352a-352e may comprise the variable sized data cubes. For example, the subset 360 may comprise the variable sized subset of the data cubes 352a-352i. The data cubes 352e-352f may comprise the predetermined sized data cubes. For example, the subset 362 may comprise the predetermined sized subset of the data cubes 352a-352i.

The centralized processing device 102 may receive the continuous stream of raw radar data 202, which may be operated on as the data cubes 352a-352i. The acquisition of the raw radar data 202 for the data cubes 352a-352e may begin at the time 354a. In one example, each of the variable sized data cubes 352a-352e in the variable subset 360 may begin data acquisition at the time 354a. Starting data acquisition for the variable sized data cubes 352a-352e at the same time 354a may enable all of the data from previous data cubes to be interleaved with the current data cube.

The first variable data cube 352a may comprise the temporal spatial data received from the time 354a until the time 354b. The second variable data cube 352b may comprise the temporal spatial data received from the time 354a until the time 354c. The third variable data cube 352c may comprise the temporal spatial data received from the time 354a until the time 354d. The fourth variable data cube 352d may comprise the temporal spatial data received from the time 354a until the time 354e. The fifth variable data cube 352e may comprise the temporal spatial data received from the time 354a until the time 354f.

All of the temporal spatial data from the first data cube 352a (e.g., from the time 354a to the time 354b) may be interleaved with the temporal spatial data from the second data cube 352b, all of the temporal spatial data from the second data cube 352b (e.g., from the time 354a to the time 354c) may be interleaved with the temporal spatial data from the third data cube 352c, etc. The temporal spatial data of the second data cube 352b from the time 354b to the time 354c may be the variation data 220a, the temporal spatial data of the third data cube 352c from the time 354c to the time 354d may be the variation data 220b, etc.

Each of the subsequent variable data cubes 352a-352e may increase in size compared to the previous one of the variable data cubes 352a-352b. For example, the second variable data cube 352b may be incremented by the temporal spatial samples between the time 354b to the time 354c compared to the first variable data cube 352a, the third variable data cube 352c may be incremented by the temporal spatial samples between the time 354c to the time 354d compared to the second variable data cube 352b, the fourth variable data cube 352d may be incremented by the temporal spatial samples between the time 354d to the time 354e compared to the first variable data cube 352a, etc. The size of the variable data cubes 352a-352e may be gradually increased until the size of the data cubes reaches a predetermined size. The last of the variable data cubes 352e may have the predetermined size. For example, last variable data cube 352e may also be the first of the subset of the predetermined size data cubes 362.

The frame output data (e.g., FO1-FO5) that corresponds to the respective variable data cubes 352a-352e may be generated some time (e.g., shortly after) all the data for the particular one of the variable data cubes 352a-352e has been acquired. In an example, the data processing times (e.g., TDP-1-TDP-5) may be the data processing times. For illustrative purposes, the frame output data FO1-FO5 may be described as being output at the times 354b-354f that correspond with the end of the data acquisition for the variable data cubes 354a-354e. In the example shown, the frame output data FO1 for the first variable data cube 352a may be generated at the time 354b, the frame output data FO2 for the second variable data cube 352b may be generated at the time 354c, the frame output data FO3 for the third variable data cube 352c may be generated at the time 354d, the frame output data FO4 for the fourth variable data cube 352d may be generated at the time 354e, and the frame output data FO5 for the fifth variable data cube 352e may be generated at the time 354f. In an example, the frame output data FO1-FO5 may comprise range, Doppler, azimuth and/or elevation data to enable detection and/or localization of objects in 4D space.

In the variable data cube implementation 350, the frame output data FO1 may be generated at the time 354b. The output latency $T_o$ may be the amount of time from the time 354a to the time 354b. By comparison, the frame output data FO5 for the first full predetermined size data cube 352e may be generated at the time 354f. Without the variable data cube implementation 350, the first output would have been the frame output data FO5 (e.g., the first predetermined sized data cube), which would have the output latency $T_o$ as the amount of time from the time 354a to the time 354f. By implementing the variable data cube implementation 350, the output latency $T_o$ may be reduced by at least the amount of time from the time 354f to the time 354b. Since the size of the variable data cube 352e is larger than the size of the variable data cube 352a, the Doppler resolution of the frame output data FO5 may be larger than frame output data FO1. Similarly, the Doppler resolution for the frame output data FO2 may be higher than the frame output data FO1, the Doppler resolution for the frame output data FO3 may be higher than the frame output data FO2, etc.

Each of the predetermined size data cubes 352e-352i may have the same temporal spatial data size. For example, the predetermined size data cubes 352e-352i may have the predetermined size. The acquisition of the continuous raw radar data 202 for the predetermined size data cube 352f may begin at the time 354b and end at the time 354g. The acquisition of the continuous raw radar data 202 for the predetermined size data cube 352g may begin at the time 354c and end at the time 354h. The acquisition of the continuous raw radar data 202 for the predetermined size data cube 352h may begin at the time 354d and end at the time 354i. The acquisition of the continuous raw radar data 202 for the predetermined size data cube 352i may begin at the time 354e and end at the time 354j. After acquiring the continuous raw radar data 202 for the variable data cubes 352a-352e until the first predetermined size data cube 352e, all of the subsequent data cubes may have the predetermined size with data acquisition being initiated at a next time interval.

The temporal spatial data from the second predetermined size data cube 352f from the time 354b until the time 354f may be interleaved with the temporal spatial data from the first predetermined data cube 352e. The variation data 220a-220n between the first predetermined data cube 352e and the second predetermined data cube 352f may be from the time 354f until the time 354g. The temporal spatial data from the third predetermined size data cube 352g from the time 354c until the time 354g may be interleaved with the temporal spatial data from the second predetermined data cube 352g. The variation data 220a-220n between the third predetermined data cube 352g and the second predetermined data cube 352f may be from the time 354g until the time 354h. Similarly, each subsequent data cube in the subset of the predetermined size data cubes 362 may have a similar pattern of interleaving and variation with the previous data cube.

The frame output data (e.g., FO6-FO9) that corresponds to the respective predetermined size data cubes 352f-352i may be generated some time (e.g., shortly after) all the data for the particular one of the predetermined data cubes 352f-352i has been acquired. In an example, the data processing times (e.g., TDP6-TDP9) may be the data processing times. For illustrative purposes, the frame output data FO6-FO9 may be described as being output at the times 354g-354j that correspond with the end of the data acquisition for the variable data cubes 354f-354l. Similar to the frame output data FO1-FO5, the frame output data FO6-FO9 may comprise range, Doppler, azimuth and/or elevation data to enable detection and/or localization of objects in 4D space. The frame output data FO6-FO9 may be generated similar to the fixed data cube implementation described in association with FIG. 4.

Each of the frame output data FO2-FO9 may be generated at one frame interval time Tf after the previous frame output data has been generated. For example, there may be no additional latency added for generating the frame output data when the frame output data for the predetermined size data cubes 352e-352i are generated compared to generating the frame output data for the variable size data cubes 352a-352e. The Doppler resolution for the frame output data FO5-FO9 may be higher than the frame output data for the smaller variable data cubes 352a-352d. The Doppler resolution for the frame output data FO5-FO9 for the subset of the predetermined size data cubes 362 may be equivalent.

The predetermined size of the data cubes 352e-352i may be selected based on a desired Doppler resolution of the frame output data. The variable data cubes 352a-352e may be implemented to keep the output latency (e.g., the time interval between when the raw radar data 202 is first collected by the radar frontends 110a-110n until the time when the centralized processing device 102 outputs the processed frame output data) low. The particular size changes between the variable data cubes 352a-352e and/or the particular size of the predetermined size data cubes 352f-352i may be varied according to the design criteria of a particular implementation.

Figure 7:
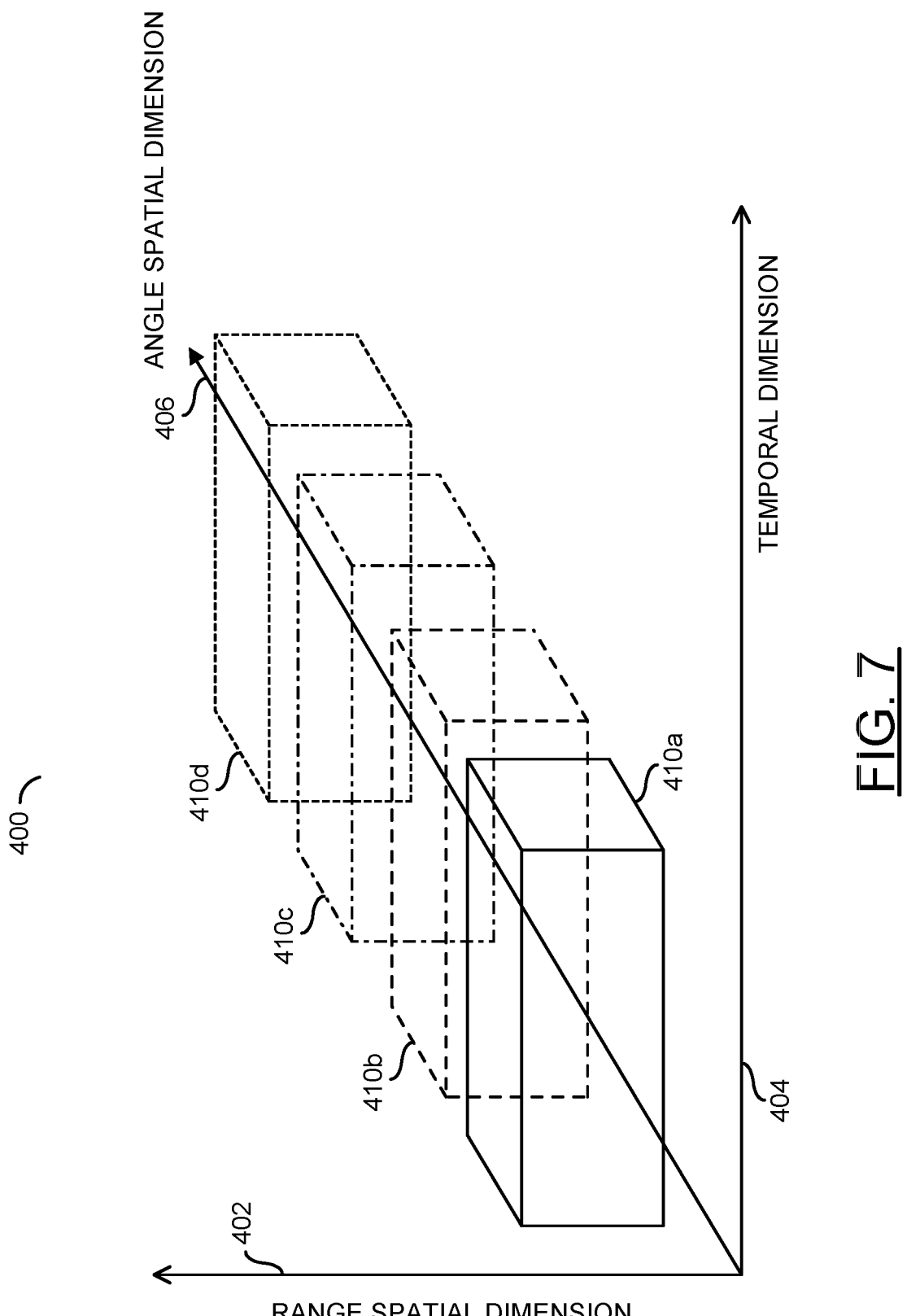
FIG. 7 is a diagram illustrating multi-snapshot coherent data integration in multiple domains.

Referring to FIG. 7, a diagram illustrating multi-snapshot coherent data integration in multiple domains is shown. A data integration example 400 is shown. The data integration example 400 may comprise STMS radar processing in multiple domains. In the examples of STMS radar processing shown in association with FIGS. 4-6, the data integration may be performed in the temporal spatial domain. The processor 130 may be configured to implement the data integration example 400 by performing the data integration in other dimensions.

A group of axes 402-406 is shown. The axis 402 may represent a range spatial dimension. The axis 404 may represent a temporal spatial dimension. The axis 406 may represent an angle spatial dimension. The centralized processing device 102 may be configured to perform the data integration of the continuous stream of raw radar data 202 in one or more of the range spatial dimension 402, the temporal spatial dimension 404 and/or the angle spatial dimension 406.

Data cubes 410a-410d are shown. In the example shown, the data cubes 410a-410d may be located along the angle spatial dimension 406. The data cubes 410a-410d may have the same number of temporal samples along the temporal spatial axis 404 and the same number of range samples along the range spatial axis 402. The data cubes 410a-410d may have different data in the angle spatial dimension 406.

The processor 130 may be configured to perform the radar signal processing by sliding the data cubes 410a-410d in other dimensions, such as the range spatial dimension 402 and/or the angle spatial dimension 406. In the example shown, the centralized processing device 102 may receive the continuous stream of raw radar data 202 and integrate the data cubes 410a-410d along the angle spatial dimension 406. For example, conceptually, the processor 130 may be configured to slide the data cubes 410a-410d along the angle spatial dimension 406. The processor 130 may interleave the data cubes 410a-410d along the angle spatial dimensions and determine the variations along the angle spatial dimension 406 in order to perform the STMS data integration and/or radar signal processing. Determining the variations along the angle spatial dimension 406 may enable the centralized processing device 102 to generate the frame output data FRAMEOUT by deriving the output for the current data cube based on the previous frame output data and the limited variation between the current data cube and the previous data cube (e.g., similar to the operations performed for the temporal spatial domain described in association with FIGS. 4-6).

Acquiring the data and interleaving the data cubes 410a-410d along the angle spatial dimension 406 may provide continuous coherent data integration in the angle domain. Acquiring the data and interleaving the data cubes 410a-410d along the range spatial dimension 402 may provide continuous coherent data integration in the range domain. By sliding data cubes in the various other dimensions (e.g., to perform the interleaving), such as range and angle dimensions, the apparatus 100 may be configured to achieve the benefits of continuous multi-snapshot coherent data integration in range and angle domains.

Figure 8:
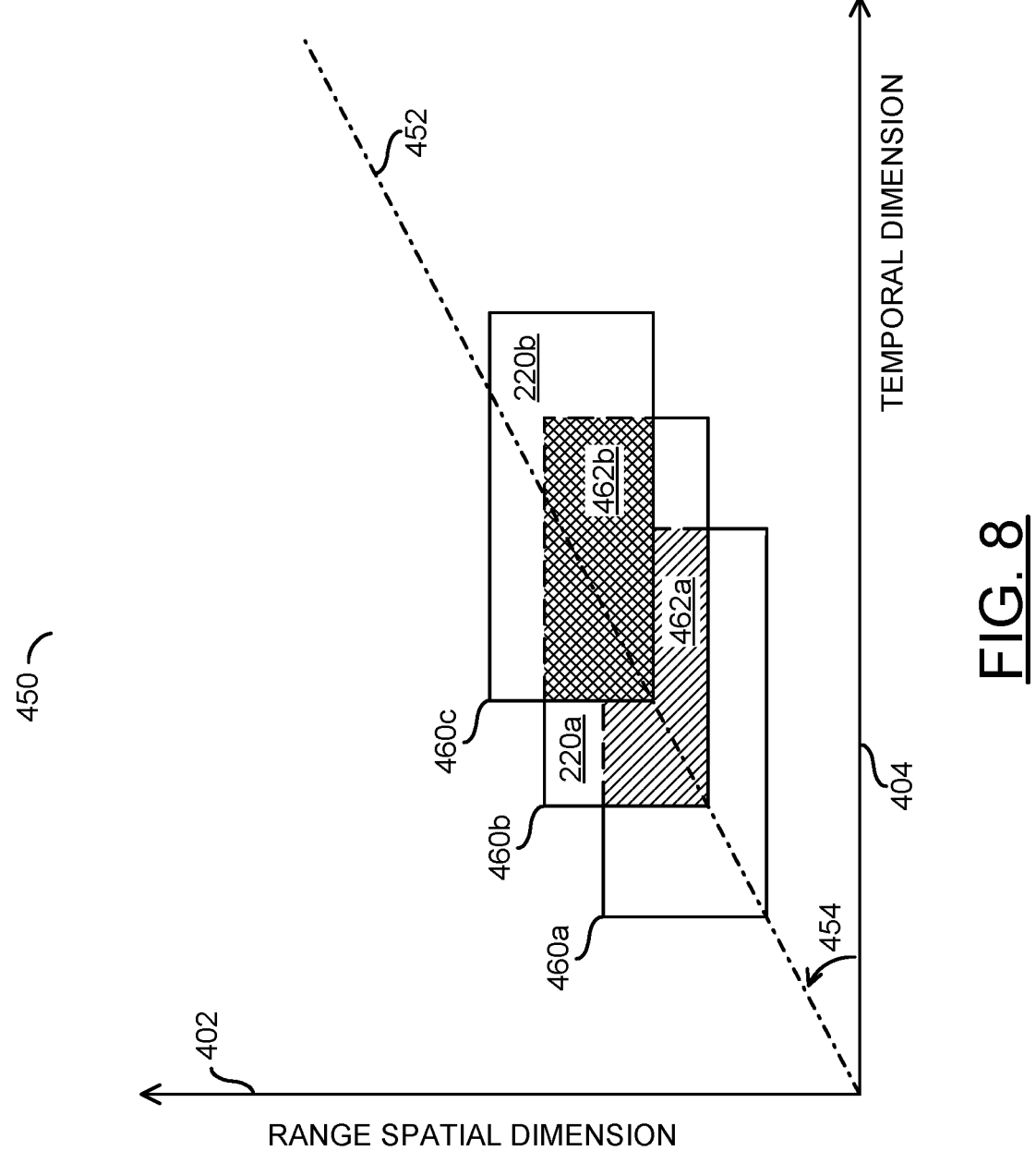
FIG. 8 is a diagram illustrating multi-snapshot coherent data integration implementing data integration in multiple domains simultaneously.

Referring to FIG. 8, a diagram illustrating multi-snapshot coherent data integration implementing data integration in multiple domains simultaneously is shown. A data integration example 450 is shown. The data integration example 450 may comprise STMS radar processing in multiple domains simultaneously. The processor 130 may be configured to implement the data integration example 450 by performing the data integration in multiple dimensions simultaneously.

The range spatial dimension axis 402 and the temporal spatial dimension axis 404 are shown represented on a two dimensional plane. For example, the angle spatial dimension axis 406 (not shown) may extend straight down below the two dimensional plane. A data integration direction 452 is shown. A data integration angle 454 is shown. The data integration direction 452 may be at the angle 454 with respect to the temporal spatial dimension axis 404. In the example shown, the angle 454 may be at approximately a 45 degree angle with respect to the temporal spatial dimension axis 404.

Boxes 460a-460c are shown. The boxes 460a-460c may represent a two dimensional view of the radar data cubes. The processor 130 may be configured to perform the data integration of the data cubes 460a-460c along the data integration direction 452. In the example shown in association with FIG. 7, the interleaving may be performed along one particular axis (e.g., the angle spatial axis 406). In the data integration example 450, by sliding (e.g., interleaving) along the angle 454 of the data integration direction 452, the processor 130 may be performed in three dimensions. In the example shown, the data interleaving may be performed in the range domain and the temporal domain simultaneously. While simultaneous range domain and temporal domain interleaving is shown, the data integration may also be performed simultaneously in the angle domain and temporal domain, simultaneously in the range domain and the angle domain simultaneously and/or simultaneously in all domains. The combination of domains that the data integration is performed in simultaneously may be varied according to the design criteria of a particular implementation.

Interleaved portions 462a-462b are shown. The interleaved portion 462a may be the overlap of data between the first data cube 460a and the second data cube 460b. The variation data 220a of the first data cube 460a and the second data cube 460b is shown. The variation data 220a may be shifted at the angle 454 along the data integration direction 452. The interleaved portion 462b may be the overlap of data between the second data cube 460b and the third data cube 460c. The variation 220b of the second data cube 460b and the third data cube 460c is shown. The variation data 220b may be shifted at the angle 454 along the data integration direction 452.

The centralized processing device 102 may be configured to adjust various parameters in order to achieve the continuous data integration in the various different combinations of dimensions. The centralized processing device 102 may be configured to adjust operating settings of the radar frontends 110a-110n based on the selected data integration directions. Details of adjusting the parameters of the radar frontends 110a-110n may be described in association with U.S. application Ser. No. 18/129,834, filed on Apr. 1, 2023, appropriate portions of which are incorporated by reference. In one example, a chirp center frequency may be continually adjusted in order to get continuous data acquisition in the range domain 402. The types of adjustments performed for the particular domains may be varied according to the design criteria of a particular implementation.

Referring to FIG. 9, a method (or process) 500 is shown. The method 500 may perform spatial temporal multi-snapshot radar signal processing. The method 500 generally comprises a step (or state) 502, a step (or state) 504, a step (or state) 506, a decision step (or state) 508, a step (or state) 510, a step (or state) 512, a decision step (or state) 514, a step (or state) 516, a step (or state) 518, a decision step (or state) 520, a step (or state) 522, and a step (or state) 524.

The step 502 may start the method 500. In the step 504, the centralized processing device 102 may receive the continuous stream of raw radar data 202. For example, one or more of the radar frontends 110*a*-110*n* may present the raw radar data 202 to the radar data interface 104. Next, in the step 506, the processor 130 may process raw radar data 202 for the current data cube 210*a*-210*b* during the first time frame (e.g., the data acquisition time TDA-1). Next, the method 500 may move to the decision step 508.

In the decision step 508, the processor 130 may determine whether to start data processing for the next data cube 212*a*-212*b*. In one example, the amount of time to wait between data cubes may be determined by a desired frame interval Tf. In another example, the amount of time to wait may be determined based on the data processing time. In yet another example, the amount of time to wait may be determined based on the throughput capability of the processor 130. If the data processing for the next data cube 212*a*-212*b* is not ready to start, then the method 500 may return to the step 506. If the data processing for the next data cube 212*a*-212*b* is ready to start, then the method 500 may move to the step 510.

In the step 510, the processor 130 may process the raw radar data 202 for the next data cube 212*a*-212*b* during the second time frame (e.g., the data acquisition time TDA-2). For example, the second time frame (e.g., the data acquisition time TDA-2) may start after the start of the first time frame (e.g., the data acquisition time TDA-1), partially overlap with the first time frame and end after the end of the first time frame. Next, in the step 512, the processor 130 may continuously interleave the raw radar data 202 for the current data cube 210*a*-210*b* and the next data cube 212*a*-212*b*. For example, the data may be interleaved from the starting edge 212*a* of the second data cube 212*a*-212*b* and the ending edge 210*b* of the first data cube 210*a*-210*b*. Next, the method 500 may move to the decision step 514.

In the decision step 514, the processor 130 may determine whether all the data has been received for the current data cube 210*a*-210*b*. Whether all the raw radar data 202 has been received may depend on the data cube size. In one example, the data cube size may be a fixed size. In another example, the data cube sizes may be variable. If all the data has not been received, then the method 500 may return to the step 512. If all the data has been received, then the method 500 may move to the step 516. In the step 516, the processor 130 may generate the current frame output data (e.g., the frame output data FO1) in response to the current data cube 210*a*-210*b*. Next, in the step 518, the processor 130 may process the limited variation 220*a* between the first data cube 210*a*-210*b* and the second data cube 212*a*-212*b*. For example, all the raw radar data 202 received for the second data cube 212*a*-212*b* after the ending edge 210*b* may be the limited variation data 220*a*. Next, the method 500 may move to the decision step 520.

In the decision step 520, the processor 130 may determine whether all the data has been received for the next data cube 212*a*-212*b*. In an example, all the raw radar data 202 may be received at the ending edge 212*b*. In the example shown in the method 500, the radar signal processing of two data cubes is described for simplicity. For example, in parallel (or substantially in parallel), the processor 130 may receive and/or interleave the raw radar data 202 for subsequent data cubes while determining the frame output data for the first two data cubes. If all the data has not been received, then the method 500 may return to the step 518. If all the data has been received, then the method 500 may move to the step 522.

In the step 522, the processor 130 may generate the next frame output data (e.g., the frame output data FO2) in response to the continuous interleaving of the next data cube 212*a*-212*b* with the current data cube 210*a*-210*b* and the limited variation data 220*a*. Next, the method 500 may move to the step 524. The step 524 may end the method 500.

Figure 10:
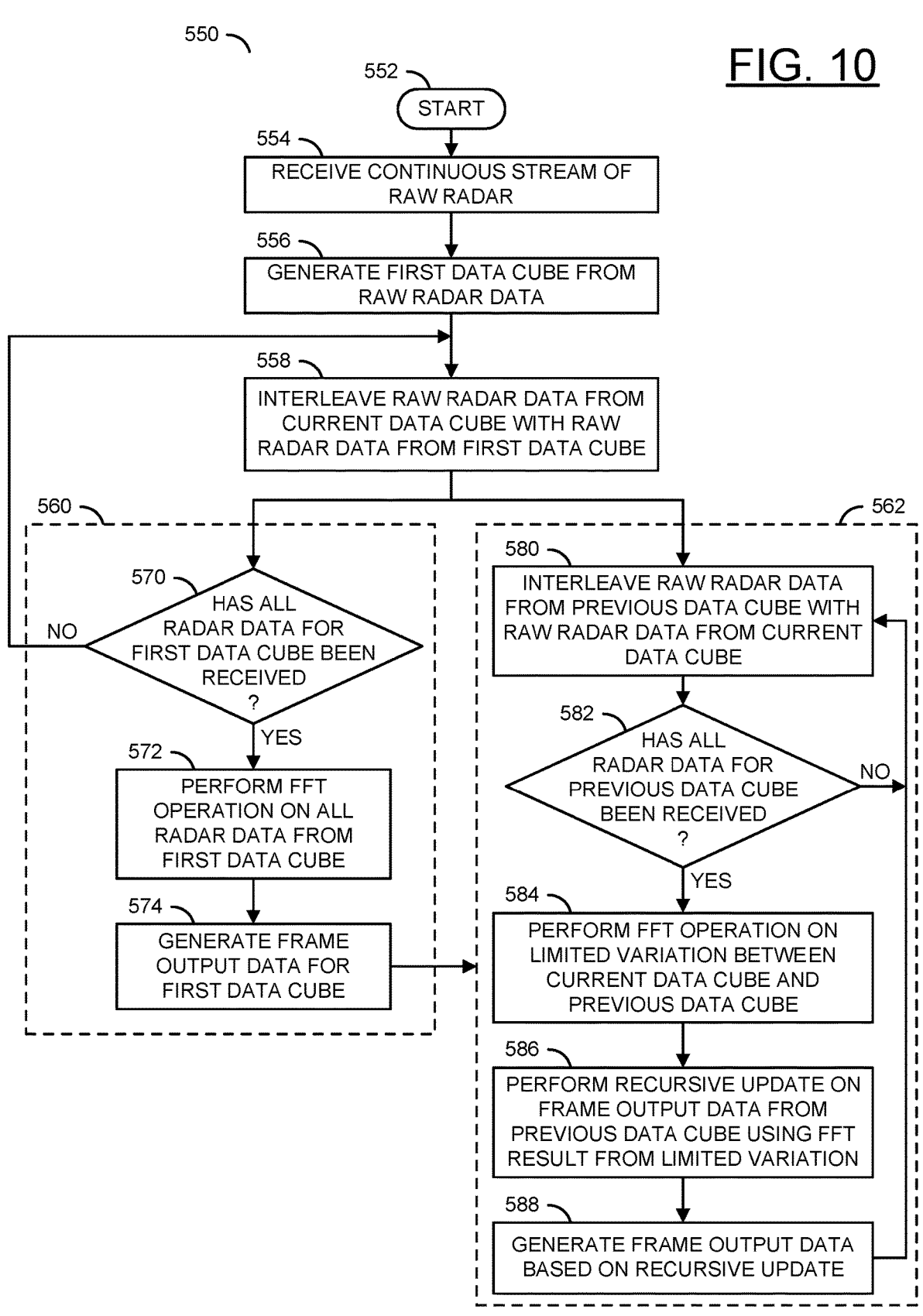
FIG. 10 is a flow diagram illustrating a method for performing recursive data updates.

Referring to FIG. 10, a method (or process) 550 is shown. The method 550 may perform recursive data updates. The method 550 generally comprises a step (or state) 552, a step (or state) 554, a step (or state) 556, a step (or state) 558, a thread (or subprocess) 560, a thread (or subprocess) 562, a decision step (or state) 570, a step (or state) 572, a step (or state) 574, a step (or state) 580, a decision step (or state) 582, a step (or state) 584, a step (or state) 586, and a step (or state) 588.

The step 552 may start the method 550. In the step 554, the centralized processing device 102 may receive the continuous stream of raw radar data 202 from one or more of the radar frontends 110*a*-110*n*. Next, in the step 556, the processor 130 may generate the first radar data cube 210*a*-210*b* from the raw radar data 202. For example, until data for the second radar data cube 212*a*-212*b* is received, the non-overlapping portion 282 of the first data cube 210*a*-210*b* may be received and/or processed. In the step 558, the processor 130 may interleave the raw radar data 202 from the current data cube (e.g., the second data cube 212*a*-212*b*) with the raw radar data 202 from the first data cube 210*a*-210*b*. For example, the interleaved portion 284 may be received. Next, the method 550 may move to the subprocess 560 and/or the subprocess 562. The subprocess 560 and the subprocess 562 may be performed in parallel and/or substantially in parallel by the processor 130.

The subprocess 560 may be configured to determine the frame output data FO1 for the first data cube 210*a*-210*b*. The subprocess 560 may be performed in parallel with the subprocess 562 until the first frame output data FO1 is generated. The subprocess 560 may move to the decision step 570. In the decision step 570, the processor 130 may determine whether all of the radar data 202 has been received for the first data cube 210*a*-210*b*. If all the data has not yet been received, then the method 550 may return to the step 558 (e.g., continue interleaving the first data cube 210*a*-210*b* and the second data cube 212*a*-212*b*). If all the data has been received, then the subprocess 560 may move to the step 572. In the step 572, the processor 130 may perform the FFT operation 290 on all the radar data from the first data cube 210*a*-210*b*. For example, since there may not be prior results to derive the output for the first data cube 210*a*-210*b*, the FFT operation 290 may be performed on all the radar data for the first data cube 210*a*-210*b*. Next, in the step 574, the processor 130 may generate the frame output data FO1 for the first data cube 210*a*-210*b* in response to the FFT operation 290 and/or other radar signal processing operations. Next, the subprocess 560 may end and the method 550 may move to the subprocess 562. The subprocess 562 may already be in progress in any of the steps 580-584.

The subprocess 562 may be configured to determine the frame output data for each of the data cubes received after the first data cube 210a-210b. The subprocess 562 may use the frame output data and/or results from the previous data cube to recursively update the results in order to generate the frame output data for the next data cube. In the step 580, the processor 130 may interleave the raw radar data 202 from the previous data cube with the raw radar data 202 from the current data cube. For example, the previous data cube may be the first data cube 210a-210b while the subprocess 560 is performed. In another example, the previous data cube may be the second data cube 212a-212b after the subsequent data cube (e.g., the third data cube 214a-214b) starts being received. Next, the subprocess 562 may move to the decision step 582.

In the decision step 582, the processor 130 may determine whether all the radar data for the previous data cube has been received. For example, the frame output data FO2 for the second data cube 212a-212b may not be processed until the frame output data FO1 has been received and all the data for the second data cube 212a-212b has been received (e.g., the overlapping portion 284 and the variation data 220a). If all the data has not been received, then the subprocess 562 may return to the step 580 (e.g., continue interleaving the data). If all the data has been received, then the subprocess 562 may move to the step 584. In the step 584, the processor 130 may perform the FFT operation 292 on the limited variation data 220a-220n between the current data cube and the previous data cube. In an example, for the frame output data FO2 (e.g., when the first data cube 210a-210b is the previous data cube and the second data cube 212a-212b is the current data cube), the FFT operation 292 may be performed on the variation data 220a. In another example, for the frame output data FO3 (e.g., when the second data cube 212a-212b is the previous data cube and the third data cube 214a-214b is the current data cube), the FFT operation 292 may be performed on the variation data 220b. Next, the subprocess 562 may move to the step 586.

In the step 586, the processor 130 may perform the combination operation 312 and/or the recursive update operation 314 on the frame output data from the previous data cube and the result of the FFT operation 292 on the variation data of the current data cube. In one example for the frame output data FO2 (e.g., the first data cube 210a-210b is the previous data cube and the second data cube 212a-212b is the current data cube), the recursive update operation 314 may be performed on the frame output data FO1 from the first FFT data cube 300 and the result of the FFT operation 292 performed on the variation data 220a. In another example, for the frame output data FO3 (e.g., the second data cube 212a-212b is the previous data cube and the third data cube 214a-214b is the current data cube), the recursive update operation 314 may be performed on the output from the second FFT data cube result and the result of the FFT operation 292 performed on the variation data 220b. Next, in the step 588, the processor 130 may generate the frame output data based on the recursive update. In an example, the FFT data cube 316 may be generated. Next, the subprocess 562 may return to the step 580. The method 550 may repeat the subprocess 562 for each subsequent data cube. When repeating the subprocess 562, the current data cube that generated the frame output data may become the previous data cube and the next subsequent data cube may become the current data cube.

Figure 11:
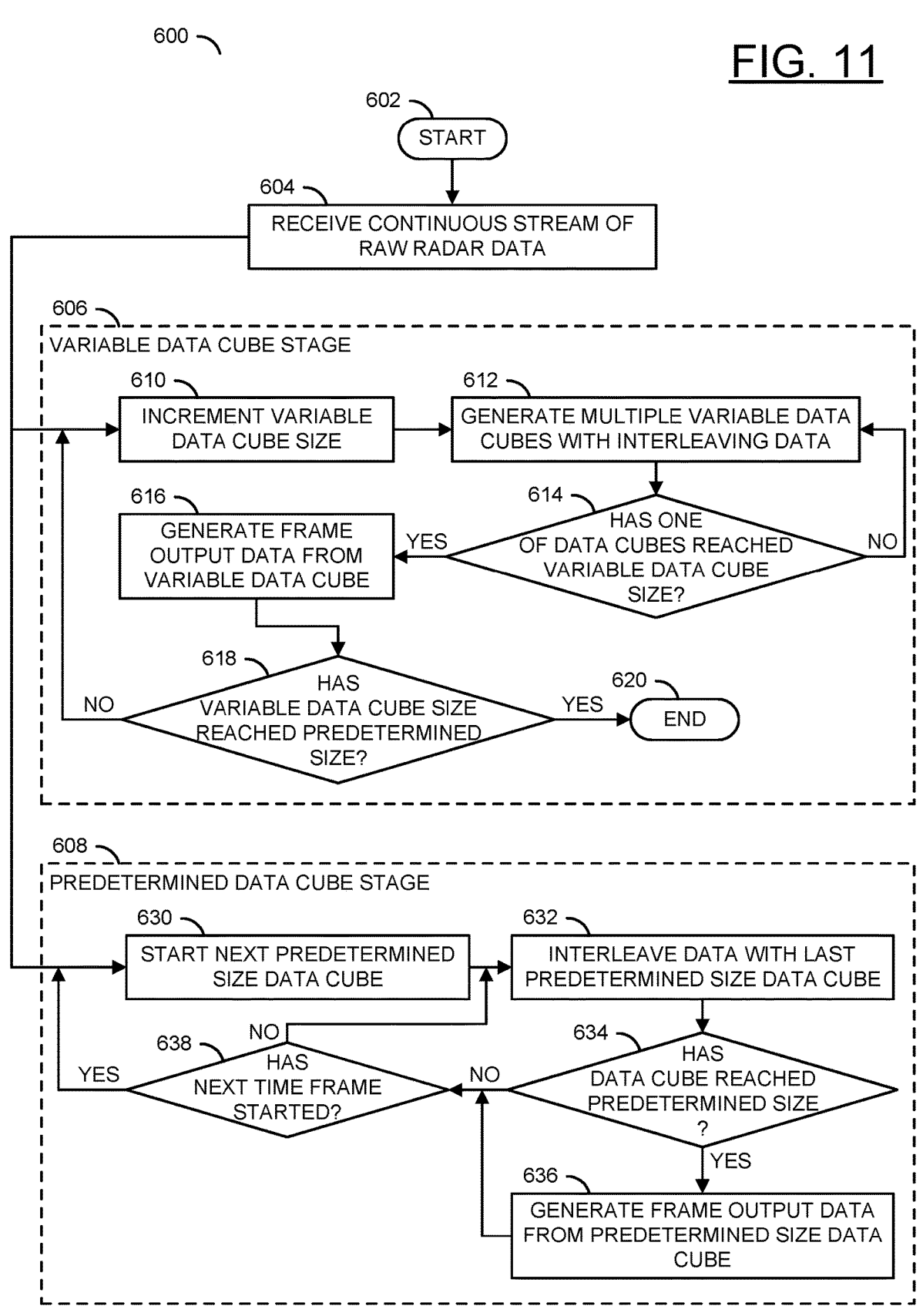
FIG. 11 is a flow diagram illustrating a method for implementing variable data cube sizes and predetermined data cube sizes to reduce output latency.

Referring to FIG. 11, a method (or process) 600 is shown. The method 600 may implement variable data cube sizes and predetermined data cube sizes to reduce output latency.

The method 600 generally comprises a step (or state) 602, a step (or state) 604, a stage (or subprocess) 606, a stage (or subprocess) 608, a step (or state) 610, a step (or state) 612, a decision step (or state) 614, a step (or state) 616, a decision step (or state) 618, a step (or state) 620, a step (or state) 630, a step (or state) 632, a decision step (or state) 634, a step (or state) 636, and a decision step (or state) 638.

The step 602 may start the method 600. In the step 604, the centralized processing device 102 may receive the continuous stream of raw radar data 202 from one or more of the radar frontends 110a-110n. Next, the method 600 may move to the stage 606 and/or the stage 608. The stage 606 and the stage 608 may be performed in parallel and/or substantially in parallel.

The stage 606 may be a variable data cube stage. For example, the method 600 may generate the subset of multiple variable sized data cubes 360 in order to reduce the output latency $T_o$. In the step 610, the processor 130 may increment the variable data cube size. For example, the first variable sized data cube 352a may have an initial (e.g., smallest) data cube size. Next, in the step 612, the processor 130 may initiate the generation of multiple variable sized data cubes of the subset 360. For example, the variable sized data cubes 352a-352e may begin the accumulation of data starting from the initial time 354a. Each of the multiple variable sized data cubes in the subset 360 may be interleaved with each other. Next, the stage 606 may move to the decision step 614.

In the decision step 614, the processor 130 may determine whether one of the multiple variable sized data cubes in the subset 360 has reached the variable data size. In an example, the first variable sized data cube 352a may have the smallest size and reach the variable data size at the time 354b. If none of the variable sized data cubes 360 have reached the current variable data size, then the stage 606 may return to the step 612. If one of the variable sized data cubes in the subset 360 has reached the current variable data size, then the stage 606 may move to the step 616. In the step 616, the processor 130 may generate the frame output data in response to the variable sized data cube. For example, the relatively low resolution frame output data FO1 may be generated in response to the first variable sized data cube 352a. Next, the stage 606 may move to the decision step 618.

In the decision step 618, the processor 130 may determine whether the variable data cube size has reached the predetermined data cube size. For example, the variable data cube size may be iteratively incremented until reaching the predetermined data cube size (e.g., selected based on the desired output Doppler resolution). If the variable size has not reached the predetermined data cube size, then the stage 606 may return to the step 610 (e.g., to increment the variable data cube size and generate the relatively low resolution frame output data for the next one of the multiple variable size data cubes 360). If the variable size has reached the predetermined data cube size, then the stage 606 may move to the step 620. For example, after the first predetermined size data cube 352e is generated, then the variable sized data cubes may stop being adjusted. The step 620 may end the stage 606.

The stage 608 may be a predetermined data cube stage. For example, the method 600 may generate the multiple predetermined sized data cubes subset 362 after the variable sized data cubes have reached the predetermined data cube size in order to achieve the desired Doppler resolution. In the step 630, the processor 130 may start the next predetermined size data cube 362. For example, the stage 608 may wait until the second time 354b before processing and/or acquiring data for the first predetermined size data cube 352_f._ Next, in the step 632, the processor 130 may interleave the raw radar data 202 with the last predetermined size data cube. For example, the data from the first predetermined size data cube 352_e_ may be interleaved with the next predetermined size data cube 352_f._ Next, the stage 608 may move to the decision step 634.

In the decision step 634, the processor 130 may determine whether the data cube has reached the predetermined size. If the processor has reached the predetermined size, then the stage 608 may move to the step 636. In the step 636, the processor 130 may generate the relatively high resolution frame output data from the predetermined sized data cube. Next, the stage 608 may move to the decision step 638. In the decision step 634, if the data cube has not yet reached the predetermined size, then the stage 608 may move to the decision step 638.

In the decision step 638, the processor 130 may determine whether the next time frame has started. If the next time frame has not started, then the stage 608 may move to the step 632 (e.g., continue interleaving the continuous raw radar data 202 until the predetermined data size has been reached). If the next time frame has started, then the stage 608 may return to the step 630 (e.g., start acquiring data for the next predetermined size data cube 362).

Referring to FIG. 12, a method (or process) 650 is shown. The method 650 may implement centralized spatial temporal multi-snapshot radar signal processing. The method 650 generally comprises a step (or state) 652, a step (or state) 654_a_, a step (or state) 654_b_, a step (or state) 656_a_, a step (or state) 656_b_, a decision step (or state) 658_a_, a decision step (or state) 658_b_, a step (or state) 660_a_, a step (or state) 660_b_, a step (or state) 662, and a step (or state) 664.

The step 652 may start the method 650. Next, the method 650 may move to the step 654_a_ and the step 654_b_. In the example shown, steps 654_a_-660_a_ are shown performed in parallel and/or substantially in parallel with the steps 654_b_-660_b_ for simplicity. The method 650 may additionally comprise additional parallel steps (e.g., the steps 654_c_-660_c_ through 654_n_-660_n_) depending on the number of radar frontends 110_a_-110_n_ implemented by the apparatus 100. In an example, the continuous stream of radar data 202 and/or the frame output data generated may be performed and/or calculated independently by the processor 130 for each of the radar frontends 110_a_-110_n_.

In the step 654_a_, the centralized processing device 102 may receive the continuous stream of raw radar data 202 from the first radar frontend 110_a_. In the step 654_b_, the centralized processing device 102 may receive the continuous stream of raw radar data 202 from the second radar frontend 110_b_. In the step 656_a_, the processor 130 may interleave the current and previous respective data cubes from the first radar frontend 110_a_. In the step 656_b_, the processor 130 may interleave the current and previous respective data cubes from the second radar frontend 110_b_. Next, the method 650 may move to the decision step 658_a_ and the decision step 658_b_.

In the decision step 658_a_, the processor 130 may determine whether all of the data has been received for the previous respective data cube corresponding to the radar frontend 110_a_. If all the data has not been received, then the method 650 may return to the step 654_a_. If all the data has been received, then the method 650 may move to the step 660_a_. In the decision step 658_b_, the processor 130 may determine whether all of the data has been received for the previous respective data cube corresponding to the radar frontend 110_b_. If all the data has not been received, then the method 650 may return to the step 654_b_. If all the data has been received, then the method 650 may move to the step 660_b_. In the step 660_a_, the processor 130 may generate the respective frame output data (e.g., the frame output data FO1a) corresponding to the first radar frontend 110_a_ in response to the interleaved data and the limited variation data between the partially interleaved respective data cubes. Next, the method 650 may move to the step 662. In the step 660_b_, the processor 130 may generate the respective frame output data (e.g., the frame output data FO1b) corresponding to the second radar frontend 110_b_ in response to the interleaved data and the limited variation data between the partially interleaved respective data cubes. Next, the method 650 may move to the step 662.

In the step 662, the processor 130 may combine the frame output data from the multiple radar frontends 110_a_-110_n_. Next, in the step 664, the processor 130 may perform centralized radar processing to generate high resolution detections. For example, by combining the respective frame output data from all of the radar frontends 110_a_-110_n_, the processor 130 may detect objects in the environment 40 all around the vehicle 50. Details of combining data from multiple radar frontends and/or performing the centralized radar processing may be described in association with U.S. application Ser. No. 18/129,834, filed on Apr. 1, 2023, appropriate portions of which are incorporated by reference. Next, the method 650 may return to the step 654_a_ and the step 654_b_ (and other steps 654_c_-654_n_ performed in parallel).

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICS (application specific integrated circuits), Platform ASICS, FPGAS (field programmable gate arrays), PLDs (programmable logic devices), CPLDs (complex programmable logic devices), sea-of-gates, RFICS (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMS (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive a continuous stream of raw radar data from a radar communication device; and
a processor configured to (i) receive said continuous stream of said raw radar data from said interface, (ii)

process a first data cube from said raw radar data during a first time frame, (iii) process a second data cube from said raw radar data during a second time frame, (iv) perform a continuous interleaving of said second data cube with said first data cube as said raw radar data for said first data cube and said second data cube are received, (v) generate a first frame output data in response to said first data cube, (vi) generate a second frame output data in response to said continuous interleaving of said second data cube with said first data cube and (vii) generate radar detections in response to said first frame output data and said second frame output data, wherein
(a) said first time frame starts before said second time frame,
(b) said first time frame overlaps with said second time frame after said second time frame starts to enable said continuous interleaving of said second data cube with said first data cube,
(c) performing said continuous interleaving of said second data cube with said first data cube enables (i) an overlapping portion of information between said first data cube and said second data cube to be equivalent and (ii) a limited variation between said first data cube and said second data cube that is smaller than a size of a spatial temporal domain, and
(d) said limited variation enables said second frame output data to be derived from said first frame output data.

2. The apparatus according to claim 1, wherein said continuous interleaving of said second data cube with said first data cube is configured to enable said first frame output data and said second frame output data to be generated in response to a large data cube size and a high output rate simultaneously.

3. The apparatus according to claim 1, wherein said continuous interleaving of said second data cube with said first data cube is configured to resolve a conflict between (i) a resolution of said first frame output data and said second frame output data being proportional to a size of a data cube processed and (ii) an output rate for generating said first frame output data and said second frame output data being inversely proportional to said size of said data cube processed.

4. The apparatus according to claim 1, wherein said continuous interleaving of said second data cube with said first data cube provides continuous coherent multi-snapshot integration.

5. The apparatus according to claim 1, wherein said apparatus is configured to provide spatial temporal multi-snapshot radar signal processing.

6. The apparatus according to claim 1, wherein a data output rate for said radar detections in response to said continuous stream of said raw radar data is (i) independent of an amount of data acquisition time and (ii) dependent on a data processing time of said processor.

7. The apparatus according to claim 1, wherein (i) said continuous interleaving of said second data cube with said first data cube is in a temporal dimension and (ii) said variation in said temporal dimension provides a limited difference in angle information between said first data cube and said second data cube.

8. The apparatus according to claim 1, wherein said continuous interleaving of said second data cube with said first data cube (i) is performed by said processor in an angle spatial dimension and (ii) provides continuous coherent data integration in an angle domain.

9. The apparatus according to claim 1, wherein said continuous interleaving of said second data cube with said first data cube (i) is performed by said processor in a range spatial dimension and (ii) provides continuous coherent data integration in a range domain.

10. The apparatus according to claim 1, wherein said processor is a centralized processor configured to receive said continuous stream of said raw radar data from said radar communication device at an edge site.

11. The apparatus according to claim 10, wherein said edge site is a location on a vehicle.

12. The apparatus according to claim 10, wherein (i) said interface is configured to receive one or more additional continuous streams of said raw radar data from a one or more additional radar communication devices located at respective edge sites and (ii) said centralized processor is further configured to (a) process first respective data cubes from said raw radar data corresponding to said additional radar communication devices during said first time frame, (b) process second respective data cubes from said raw radar data corresponding to said additional radar communication devices during said second time frame, (c) perform continuous interleaving of said second respective data cubes with said first respective data cubes, (d) generate a first respective frame output data in response to each of said first respective data cubes and (e) generate a second respective output data frame data in response to said continuous interleaving of said second respective data cubes with said first respective data cubes.

13. The apparatus according to claim 1, wherein said first data cube and said second data cube each have a fixed size.

14. The apparatus according to claim 1, wherein (i) a difference between said first time frame and said second time frame is less than a length of said first time frame to provide said variation between said first data cube and said second data cube, (ii) said variation comprises new information in said second data cube, (ii) said processor is further configured to use said new information to recursively update said first frame output data to provide said second frame output data.

15. The apparatus according to claim 1, wherein (i) processing of said continuous stream of said raw radar data is initiated in parallel for said first data cube, said second data cube, a plurality of variable data cubes and a first predetermined data cube, (ii) said first data cube has a first data cube size, (iii) said second data cube has a second data cube size, (iv) said second data cube size is larger than said first data cube size, (v) each of said plurality of variable data cubes has a variable data cube size (a) larger than said second data cube size and (b) smaller than a subsequent one of said plurality of variable data cubes and (vi) a fixed size of said first predetermined data cube is larger than any of plurality of variable data cubes.

16. The apparatus according to claim 15, wherein said fixed size is determined based on a desired resolution of frame output data generated by said apparatus.

17. The apparatus according to claim 16, wherein (i) said first frame output data and said second frame output data are generated with a relatively low latency and relatively low resolution, (ii) said frame output data generated in response to said plurality of variable data cubes has a relatively higher latency and a relatively higher resolution than said first frame output data and said second frame output data, (iii) said relatively higher resolution is less than said desired resolution and (iv) said first frame output data, said second frame output data and said frame output data generated in response to said variable data cubes are each output before said frame output data generated in response to said first predetermined data cube.

18. The apparatus according to claim 16, wherein (i) processing of said continuous stream of said raw radar data for said frame output data after said first predetermined data cube comprises processing a plurality of predetermined data cubes and (ii) each of said plurality of predetermined data cubes has said fixed size.

19. A system comprising:

a radar communication device configured to (i) transmit a probe signal and (ii) generate raw radar data in response to a reflection of said probe signal; and a processor configured to (i) receive a continuous stream of said raw radar data from said radar communication device, (ii) process a first data cube from said raw radar data during a first time frame, (iii) process a second data cube from said raw radar data during a second time frame, (iv) perform a continuous interleaving of said second data cube with said first data cube as said first data cube and said second data cube are received, (v) generate a first frame output data in response to said first data cube, (vi) generate a second frame output data in response to said continuous interleaving of said second data cube with said first data cube and (vii) generate radar detections in response to said first frame output data and said second frame output data, wherein (a) said first time frame starts before said second time frame, (b) said first time frame overlaps with said second time frame after said second time frame starts to enable said continuous interleaving of said second data cube with said first data cube, (c) performing said continuous interleaving of said second data cube with said first data cube enables (i) an overlapping portion of information between said first data cube and said second data cube to be equivalent and (ii) a variation between said first data cube and said second data cube that is smaller than a size of a spatial temporal domain, and (d) said variation enables said second frame output data to be derived from said first frame output data.

* * * * *